US012423628B2

(12) United States Patent
Menon et al.

(10) Patent No.: US 12,423,628 B2
(45) Date of Patent: Sep. 23, 2025

(54) OPTIMIZING GREEN HOUSE GAS SUSTAINABILITY WITH ACTION PLANS FOR AN ENTERPRISE

(71) Applicant: Schlumberger Technology Corporation, Sugar Land, TX (US)

(72) Inventors: Shashi Menon, Houston, TX (US); Hemant Arora, Houston, TX (US); David Seabrook, London (GB); Gian-Marcio Gey, London (GB); Hans Eric Klumpen, Houston, TX (US); Debasish Das, Houston, TX (US); Federico Sporleder, Pune (IN); Jing Zhang, Houston, TX (US); Rajarshi Ray, London (GB); Nader Salman, Houston, TX (US); Stephanie Lee, Houston, TX (US); Colin Wier, Houston, TX (US); Neeraj Kamat, Pune (IN); Harshada Modak, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/734,247

(22) Filed: Jun. 5, 2024

(65) Prior Publication Data

US 2024/0403894 A1    Dec. 5, 2024

Related U.S. Application Data

(60) Provisional application No. 63/471,174, filed on Jun. 5, 2023.

(51) Int. Cl.
*G06Q 10/063*    (2023.01)
*G06Q 10/0631*    (2023.01)
(Continued)

(52) U.S. Cl.
CPC ..... *G06Q 10/063* (2013.01); *G06Q 10/06315* (2013.01); *G06Q 10/0633* (2013.01);
(Continued)

(58) Field of Classification Search
CPC ............... G06Q 10/063; G06Q 10/067; G06Q 10/0637; G06Q 10/0633; G06Q 30/018; G06Q 50/02
See application file for complete search history.

(56) References Cited

U.S. PATENT DOCUMENTS

| 7,584,165 B2 | 9/2009 | Buchan |
| 9,075,408 B2 | 7/2015 | Loldj |

(Continued)

FOREIGN PATENT DOCUMENTS

| CN | 110110904 | 8/2019 |
| CN | 113969774 | 1/2022 |

(Continued)

OTHER PUBLICATIONS

A. Farajzadeh, R., et al., "Life-cycle production optimiation of hydrocarbon fields: thermoeconomics perspective." Sustainable Energy & Fuels 3.11 (2019): 3050-3060. (Year: 2019).

(Continued)

*Primary Examiner* — William S Brockington, III
(74) *Attorney, Agent, or Firm* — Michael Guthrie

(57) ABSTRACT

A method may include receiving a sustainability model indicative of a plurality of sustainability parameters associated with enterprise operations corresponding to production data for operational tasks performed in a hydrocarbon production system, facility data corresponding to utility operations within buildings associated with the enterprise, or both. The method involves simulating implementing action plans via devices that correspond to the enterprise operations over time to determine an amount of greenhouse gas (GHG)

(Continued)

emissions associated with the enterprise over time, generating a GHG footprint evolution report based on the amount of GHG emissions, and identifying at least one of a plurality of engineering workflow systems to reduce the amount of GHG emissions based on the GHG footprint evolution report. The method involves sending commands to devices of the plurality of devices based on the action plan, such that the commands are cause the devices to adjust their operations.

20 Claims, 11 Drawing Sheets

(51) Int. Cl.
  *G06Q 10/0633* (2023.01)
  *G06Q 10/0637* (2023.01)
  *G06Q 10/0639* (2023.01)
  *G06Q 10/067* (2023.01)
  *G06Q 50/02* (2012.01)

(52) U.S. Cl.
  CPC ..... *G06Q 10/0637* (2013.01); *G06Q 10/0639* (2013.01); *G06Q 10/067* (2013.01); *G06Q 50/02* (2013.01)

(56) References Cited

U.S. PATENT DOCUMENTS

| | | | |
|---|---|---|---|
| 10,339,478 | B2 | 7/2019 | Grant |
| 10,373,085 | B1 | 8/2019 | Baghdikian |
| 2007/0078692 | A1 | 4/2007 | Vyas |
| 2008/0077371 | A1 | 3/2008 | Yeten |
| 2011/0061295 | A1 | 3/2011 | McAlister |
| 2011/0320054 | A1 | 12/2011 | Brzezowski |
| 2012/0271669 | A1 | 10/2012 | Taper |
| 2013/0098049 | A1 | 4/2013 | Kraemer et al. |
| 2013/0226648 | A1 | 8/2013 | Horch et al. |
| 2014/0249892 | A1 | 9/2014 | Lobato Moreno |
| 2016/0350778 | A1 | 12/2016 | Levine et al. |
| 2017/0051681 | A1 | 2/2017 | Arias Chao |
| 2017/0321656 | A1 | 11/2017 | Eisenberger |
| 2018/0231967 | A1 | 8/2018 | Cohen |
| 2018/0266241 | A1 | 9/2018 | Ferguson et al. |
| 2019/0335674 | A1 | 11/2019 | Basso |
| 2019/0370690 | A1 | 12/2019 | Anderson |
| 2019/0385244 | A1 | 12/2019 | Stelmar Netto |
| 2021/0238971 | A1 | 8/2021 | Crumpton |
| 2021/0372864 | A1 | 12/2021 | Tao et al. |
| 2021/0388717 | A1 | 12/2021 | Srinivasan |
| 2022/0018231 | A1* | 1/2022 | Weatherhead .......... H04L 9/088 |
| 2022/0027810 | A1 | 1/2022 | Murthy |
| 2022/0065834 | A1 | 3/2022 | Gadot et al. |
| 2022/0076182 | A1 | 3/2022 | Vollmert et al. |
| 2022/0122015 | A1 | 4/2022 | Bandopadhyay |
| 2022/0230250 | A1 | 7/2022 | Kawamori |
| 2022/0243570 | A1 | 8/2022 | Xiao et al. |
| 2022/0284519 | A1 | 9/2022 | Pancholi et al. |
| 2022/0325887 | A1 | 10/2022 | Wang et al. |
| 2022/0343229 | A1* | 10/2022 | Gruber ................. G06Q 10/063 |
| 2022/0343433 | A1* | 10/2022 | Yan ......................... G06Q 40/06 |
| 2022/0358515 | A1* | 11/2022 | Kahn ....................... G06F 30/27 |
| 2022/0390137 | A1* | 12/2022 | Wenzel ................ G06Q 10/063 |
| 2022/0404050 | A1 | 12/2022 | Chang et al. |
| 2023/0085641 | A1 | 3/2023 | Jones et al. |
| 2023/0152763 | A1 | 5/2023 | Davis et al. |
| 2023/0186217 | A1* | 6/2023 | Kulkarni ............ G06Q 10/0635 |
| | | | 705/7.36 |
| 2023/0222388 | A1 | 7/2023 | Cella |
| 2023/0351300 | A1 | 11/2023 | Nielsen et al. |
| 2023/0359970 | A1* | 11/2023 | Bachman ................ G16C 20/20 |
| 2023/0385299 | A1 | 11/2023 | Al Rasheed et al. |
| 2024/0019882 | A1* | 1/2024 | Suri ........................ F24F 11/80 |
| 2024/0067884 | A1 | 2/2024 | Rooney et al. |
| 2024/0070680 | A1* | 2/2024 | Takawale .......... G06Q 30/0631 |
| 2024/0281826 | A1 | 8/2024 | Mallet |
| 2024/0403777 | A1 | 12/2024 | Menon |
| 2024/0403778 | A1 | 12/2024 | Menon |
| 2024/0403782 | A1 | 12/2024 | Menon |
| 2024/0403784 | A1 | 12/2024 | Menon |
| 2024/0403799 | A1 | 12/2024 | Menon |
| 2024/0403893 | A1 | 12/2024 | Menon |
| 2024/0403895 | A1 | 12/2024 | Menon |

FOREIGN PATENT DOCUMENTS

| | | |
|---|---|---|
| CN | 114565319 | 5/2022 |
| CN | 115563757 | 1/2023 |
| KR | 101448453 B1 | 10/2014 |
| KR | 10-1993366 | 9/2019 |
| WO | 2009152553 A9 | 12/2009 |
| WO | 2016196351 | 12/2016 |
| WO | 2020263693 | 12/2020 |
| WO | 2023009865 | 2/2023 |
| WO | 2023017164 | 2/2023 |
| WO | 2023033832 | 3/2023 |
| WO | 2023154091 | 8/2023 |

OTHER PUBLICATIONS

Farsan et al., "Value Change in the Value Chain: Best Practices in Scope 3 Greenhouse Gas Management", Climate—KIC, Version 3.0, Nov. 2018. (Year: 2018), 44 pages.
Non-Final Office Action issued in U.S. Appl. No. 18/733,939 on Aug. 6, 2024; 63 pages.
Non-Final Office Action issued in U.S. Appl. No. 18/733,951 on Aug. 8, 2024; 19 pages.
Non-Final Office Action issued in U.S. Appl. No. 18/734,079 on Aug. 27, 2024; 28 pages.
International Search Report and Written Opinion issued in International Patent Application No. PCT/US2024/032503 on Sep. 13, 2024; 12 pages.
International Search Report and Written Opinion issued in International Patent Appl. No. PCT/US2024/032506 on Sep. 11, 2024, 10 pages.
International Search Report and Written Opinion issued in International Patent Appl. No. PCT/US2024/032490 on Sep. 27, 2024, 13 pages.
International Search Report and Written Opinion issued in International Patent Appl. No. PCT/US2024/032483 on Sep. 27, 2024, 9 pages.
Non-Final Office Action issued in U.S. Appl. No. 18/734,238 on Sep. 24, 2024; 29 pages.
International Search Report and Written Opinion issued in International Patent Appl. No. PCT/US2024/032475 on Sep. 30, 2024, 10 pages.
Office Action issued in U.S. Appl. No. 18/733,939 dated Dec. 5, 2024, 96 pages.
Office Action issued in U.S. Appl. No. 18/734,238 dated Jan. 6, 2025, 38 pages.
Notice of Allowance issued in U.S. Appl. No. 18/733,951 dated Jan. 15, 2025, 20 pages.
International Search Report and Written Opinion issued in International Patent Appl. No. PCT/US2024/032509 on Sep. 13, 2024; 10 pages.
International Search Report and Written Opinion issued in International Patent Appl. No. PCT/US2024/032513 on Sep. 12, 2024; 11 pages.
International Search Report and Written Opinion issued in International Patent Appl. No. PCT/US2024/032519 on Sep. 19, 2024; 11 pages.
Non-Final Office Action issued in U.S. Appl. No. 18/734,268 on Oct. 21, 2024; 35 pages.
Sipola, J. et al., "Adopting artificial intelligence in sustainable business", Journal of Cleaner Production, 2023, 426, 8 pages.

* cited by examiner

OPTIMIZING GREEN HOUSE GAS SUSTAINABILITY WITH ACTION PLANS FOR AN ENTERPRISE

CROSS-REFERENCE TO RELATED APPLICATIONS

This application claims priority to U.S. Provisional Application No. 63/471,174, filed Jun. 5, 2023, and entitled "SUSTAINABILITY PLATFORM FOR IMPROVING SUSTAINABILITY PARAMETERS ACROSS ENTERPRISE OPERATIONS," which is incorporated by reference herein in its entirety.

This application is related to U.S. Ser. No. 18/733,939, filed Jun. 5, 2024, entitled, "MANAGING FACILITY AND PRODUCTION OPERATIONS ACROSS ENTERPRISE OPERATIONS TO ACHIEVE SUSTAINABILITY GOALS"; U.S. Ser. No. 18/734,079, filed Jun. 5, 2024, entitled, "UPDATING SUSTAINABILITY ACTION PLANS FOR AN ENTERPRISE BASED ON DETECTED CHANGE IN INPUT DATA"; U.S. Ser. No. 18/733,951, filed Jun. 5, 2024, entitled, "PREDICTING SUSTAINABILITY ACTION PLAN PERFORMANCE OVER TIME"; and U.S. Ser. No. 18/734,289, filed Jun. 5, 2024, entitled, "UPDATING SUSTAINABILITY ACTION PLANS BASED ON THIRD PARTY DATA", each of which is incorporated herein by reference.

BACKGROUND

This disclosure relates generally to providing plans, workflows, and recommendations for improving sustainability parameters across enterprise operations.

As hydrocarbons are extracted from hydrocarbon reservoirs via hydrocarbon wells in oil and/or gas fields, the extracted hydrocarbons may be transported to various types of equipment, tanks, processing facilities, and the like via transport vehicles, a network of pipelines, and the like. For example, the hydrocarbons may be extracted from the reservoirs via the hydrocarbon wells and may then be transported, via the network of pipelines, from the wells to various processing stations that may perform various phases of hydrocarbon processing to make the produced hydrocarbons available for use or transport.

The transported hydrocarbons may be processed or refined into suitable hydrocarbon products and ultimately distributed to end consumers. Overall, the hydrocarbon enterprise may be characterized as encompassing upstream, midstream, and downstream stages. At each of these stages, sustainability parameters such as energy, carbon, waste, water, and the like may be consumed or used. As enterprises move towards becoming more sustainable organizations, it may be challenging to track sustainability parameters while simultaneously identifying opportunities for improving sustainability parameters associated with the enterprise.

This section is intended to introduce the reader to various aspects of art that may be related to various aspects of the present techniques, which are described and/or claimed below. This discussion is believed to be helpful in providing the reader with background information to facilitate a better understanding of the various aspects of this disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include receiving a sustainability model indicative of a plurality of sustainability parameters associated with enterprise operations corresponding to production data for operational tasks performed in a hydrocarbon production system, facility data corresponding to utility operations within buildings associated with the enterprise, or both. The method involves simulating implementing action plans via devices that correspond to the enterprise operations over time to determine an amount of greenhouse gas (GHG) emissions associated with the enterprise over time, generating a GHG footprint evolution report based on the amount of GHG emissions, and identifying at least one of a plurality of engineering workflow systems to reduce the amount of GHG emissions based on the GHG footprint evolution report. The method involves sending commands to devices of the plurality of devices based on the action plan, such that the commands are cause the devices to adjust their operations.

Various refinements of the features noted above may be made in relation to various aspects of this disclosure. Further features may also be incorporated in these various aspects as well. These refinements and additional features may be made individually or in any combination. For instance, various features discussed below in relation to one or more of the illustrated embodiments may be incorporated into any of the above-described aspects of this disclosure alone or in any combination. The brief summary presented above is intended only to familiarize the reader with certain aspects and contexts of embodiments of this disclosure without limitation to the claimed subject matter.

For clarity and simplicity of description, not all combinations of elements provided in the aspects of the invention recited above have been set forth expressly. Notwithstanding this, the skilled person will directly and unambiguously recognize that unless it is not technically possible, or it is explicitly stated to the contrary, the consistory clauses referring to one aspect of the embodiments described herein are intended to apply mutatis mutandis as optional features of every other aspect of the invention to which those consistory clauses could possibly relate.

BRIEF DESCRIPTION OF THE DRAWINGS

Various features, aspects, and advantages of this disclosure will become better understood when the following detailed description is read with reference to the accompanying figures in which like characters represent like parts throughout the figures, wherein.

DETAILED DESCRIPTION

Figure 1:
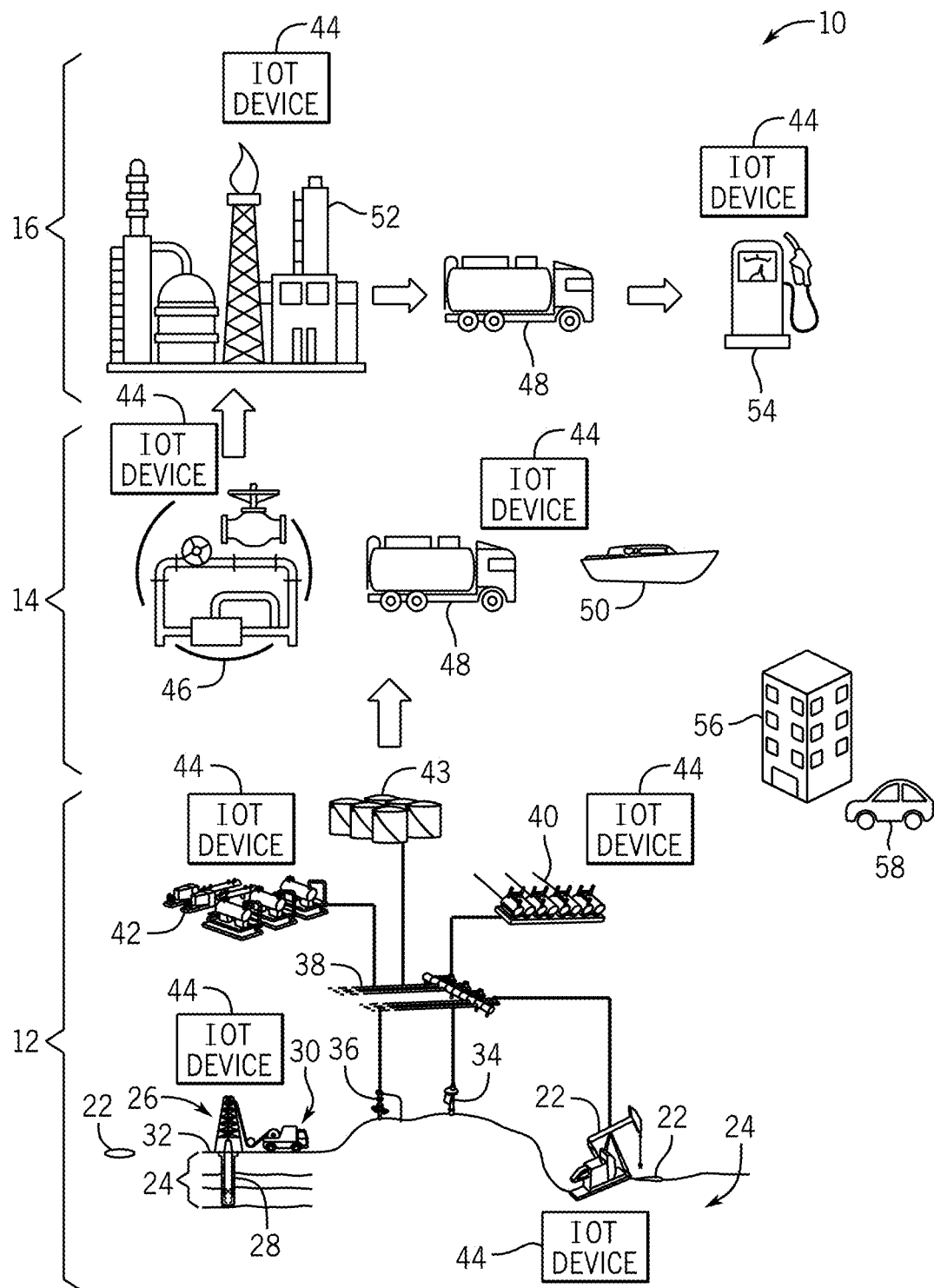
FIG. 1 illustrates a schematic diagram of example hydrocarbon production system that may include operations undertaken by an enterprise to produce, process, and distribute hydrocarbon products, according to one or more embodiments of this disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of this disclosure, the articles "a," "an," and "the" are intended to mean that there are one or more of the elements. The terms "including" and "having" are used in an open-ended fashion, and thus should be interpreted to mean "including, but not limited to . . . " Any use of any form of the terms "couple," or any other term describing an interaction between elements is intended to mean either an indirect or a direct interaction between the elements described.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

Hydrocarbon sites may include a number of components that facilitates the extraction, processing, and distribution of hydrocarbons (e.g., oil) from a well or well site. A hydrocarbon extraction site may include different types of facilities and equipment including extraction tools, pipelines, and the like. The operations related to the extraction of the hydrocarbons may often be referred to as upstream operations. After the hydrocarbons are extracted, the raw hydrocarbons may be transported via automobile vehicles, railways, barges, pipelines, or any suitable component to storage containers, processing centers, and the like. In some cases, the raw hydrocarbons may be treated (e.g., waste removal, compressed) prior to being transported to other facilities. These operations are often referred to as midstream operations. Finally, the hydrocarbons may be processed (e.g., refined) and distributed to end consumers, thereby covering downstream operations.

At each stage of operations, a certain amount of greenhouse gas emissions may be produced when performing various tasks associated with each stage. As industries move to providing a net zero carbon enterprise, the greenhouse gas emissions produced during these stages should be removed from the atmosphere. A number of action plans may be related to removing carbon from the atmosphere including afforestation, reforestation, soil carbon sequestration, carbon capture and storage technology, direct air capture technology, ocean fertilization, reducing emissions at the source, switching to sustainable power sources, reusing previously discarded resources, and the like. In addition to net zero carbon operations, industries are working to achieve improved sustainability parameters that reduce waste, conserve resources, and reduce the effects that their respective operations have on the environment.

In order to prepare action plans to achieve net zero operations, organizations may first determine baseline sustainability variable values (e.g., carbon, waste, water) that reflect the current operations of the entire organization or enterprise. That is, the organization may employ a sustainability platform system to collect data related to sustainability parameters from across the entire organization. By way of example, hydrocarbon enterprises may include a number of operations related to the manufacturing, processing, or production of hydrocarbon products. Indeed, hydrocarbon enterprises may involve operations related to upstream, midstream, and downstream operations. As such, to determine the baseline sustainability parameters, the sustainability platform system may collect data from sensors, forecasting models, reports, internet-of-things (IOT) devices, image data (e.g., optical gas imaging), flaring control measurements, and other suitable data sources. Using the collected data over time, the sustainability platform system may determine baseline sustainability parameters (e.g., carbon footprint, waste levels, water usage) for the entire operational flow of the enterprise over a period of time (e.g., days, weeks, months, years).

Based on the macro-outlook of future sustainability goals as provided by a user, the sustainability platform system may then employ a planning module to determine action plans to determine a number of sustainability operations to employ to cause the baseline sustainability parameters to trend towards net zero operations. The planning operations employed by the sustainability platform system may involve reviewing digital models, empirical models, or insights received from previous operations at facilities other than the respective enterprise to determine operational changes to operations performed within the enterprise, additional operations (e.g., install carbon capture technology) to add to the enterprise, and other suitable action plans to cause the enterprise operations to improve sustainability parameters.

The action plans may thus be related to facility level operations that optimize sustainability efficiencies at a facility level that may involve modifying certain processes (e.g., order or time to perform performing tasks based on sustainable energy source schedule) to optimize sustainability efficiencies. The facilities of an enterprise may be related to buildings in which engineers and office personnel visit, as well as structures that support industrial operations such as refining operations. By evaluating the sustainability parameters with respect to the facility level, the sustainability platform system may provide action plans to coordinate facility operations (e.g., work from home days, lighting operations, operational task schedules) to improve sustainability efficiencies.

In addition, enterprises may perform certain operations to produce or manufacture a product. The sustainability platform system may also evaluate these product level operations to identify different processes, equipment, or devices to use to improve sustainability parameters related to the operations that correspond to the operations involved in producing or manufacturing a product. By way of example, a Product carbon footprint (PCF) may be generated based on the techniques described herein to illustrate a total greenhouse emission generated by a product over the different stages of its life cycle. For instance, a cradle-to-grave PCF may include greenhouse emissions from operations related to extraction of raw materials to operations related to the end-of-life of the product.

With the foregoing in mind, the sustainability platform system may measure the sustainability parameters for the enterprise at various levels, provide reports related to the measured values, and verify the measurements to ensure that a developed action plan, when implemented, may improve sustainability efficiencies within the enterprise operations. It should be noted that the measured sustainability parameters may also be sourced or estimated as provided by certain data sources, such as emissions databases provided by EPA, IEA, and the like. In some embodiments, the sustainability platform system may collect the measured and verified data to provide reports for meeting certain governmental reporting regulations. Further, the sustainability platform system may model the determined action plans to predict the effects to the measured sustainability parameters over a period of time to determine whether the sustainability parameters will achieve desired values or ranges.

After generating the action plan, the enterprise operations may implement the outlined actions of the action plan by adjusting the operations of facilities, the operations of the production services, or the like. As the action plan takes effect, the sustainability platform system may continue to measure, validate, and report the sustainability parameters that were previously collected to perform feedback analysis to determine the effectiveness of the action plan. The results may be stored in a database or other suitable storage component to serve as empirical data for assisting other enterprises achieve their sustainability goals. Further, the feedback may be provided to the models used to generate the action plans to better calibrate certain machine learning parameters or coefficients, such that the models may more accurately reflect the actual measurements.

With the foregoing in mind, the present embodiments described herein provide a computationally efficient manner to monitor, track, project, and adjust sustainability parameters associated with operations throughout an enterprise. Indeed, some systems use integrated workflows that become prohibitively expensive with respect to cost and computational processing power by determining recommendations for achieving improved sustainability parameters without incorporating feedback mechanisms, real-time data sources, and updated projections, as described herein. By continuously tracking and updating the sustainability action plans generated for an enterprise based on input data changes detected in real time, the present embodiments may incrementally update portions of a sustainability model without independently regenerating the respective sustainability model for the enterprise. In this way, operation personnel of the enterprise may be notified in a timely manner to adjust operations for ensuring that certain sustainability target goals are achieved over a period of time as circumstances change.

Unlike other sustainability evaluation processes, which may be prohibitively slow with exhaustive sustainability parameters to account for, the present embodiments provide a more efficient analysis that reduces the amount of processing power employed by computing systems tasked to determine the recommended sustainability action plans by employing action plan modules or systems that focus on specific sustainability parameter improvements. In other words, other optimization schemes are limited by certain memory and computational parameters of existing computing systems to provide useful facilities recommendations for hydrocarbon site planning operations. However, by processing of different datasets modularly (e.g., set portions), the present embodiments described herein may allow for the ability to trade computer processing time/resources for precision of the optimal solution.

It should be noted that although the following description of various embodiments for improving sustainability parameters is described with respect to hydrocarbon enterprise operations, it should be understood that the embodiments described herein may be applied to any suitable industry including utilities, cementing operations, steel factories, and the like. Further, although the following description of the various methodologies may be detailed in the context of a particular industry or technology area, it should be noted that the methodologies described herein may be implemented within other suitable areas.

By way of introduction, FIG. 1 illustrates a schematic diagram of an example hydrocarbon production system 10 where hydrocarbon products, such as crude oil and natural gas, may be extracted from the ground, stored, transported, processed, distributed, and the like. The example hydrocarbon production system 10 is provided as an example enterprise that includes a number of different units that coordinate with each other to perform various tasks. For instance, the enterprise may include a collection of equipment, buildings, personnel, raw materials, office buildings, and other components that encompass at least some aspect of the business operations of the enterprise. In the example hydrocarbon production system 10 described below, the enterprise includes all of the processes, employees, operations, buildings, equipment, and other related components that enable the enterprise to produce, transport, and distribute hydrocarbon products. In the same way, the present embodiments described herein may be applied to other enterprises that provide other products and services and should not be limited the hydrocarbon production system 10 described below.

Referring now to FIG. 1, the hydrocarbon production system 10 may generally include an upstream system 12, a midstream system 14, and a downstream system 16. The upstream system 12 may include a number of components and equipment associated with the exploration and production of hydrocarbons. As such, geological surveys that employ seismic sources (e.g., vibrators, air guns), seismic sensors, and other equipment (e.g., fracking trucks) used for hydrocarbon exploration services may be included in the upstream system 12, although not illustrated in FIG. 1.

In addition, the upstream system 12 may include a number of components or facilities that correspond to wells, processing facilities, collection components, distribution networks, and the like. For example, as shown in FIG. 1, the upstream system 12 may include a number of wells 22 disposed within a geological formation 24. The wells 22 may include drilling platform 26 that may have performed a drilling operation (e.g., on land or subsea) to drill out a wellbore 28. Additionally, as used herein, wells 22 may generally refer to physical components such as the drilling platform 26 and wellbore 28 and/or the general area of the reservoir in which extraction is desired (e.g., a reservoir well section). The drilling operations may include drilling the wellbore 28, injecting drilling fluids into the wellbore 28, performing casing operations within the wellbore 28, exploratory operations measuring the viability of the wellbore 28, extraction operations, and the like. In addition to including the drilling platform 26, the upstream system 12 may include surface equipment 30 that may carry out certain operations, such as cement installation operation, well logging operations to detect conditions of the wellbore 28, and the like. As such, the surface equipment 30 may include equipment that store cement slurries, drilling fluids, displacement fluids, spacer fluids, chemical wash fluids, and the like. The surface equipment 30 may include piping and other materials used to transport the various fluids described above into the wellbore 28. The surface equipment 30 may also include pumps, electric or gas-powered motors, and other equipment (e.g., batch mixers, centrifugal pumps, liquid additive metering systems, tanks, etc.) that may be used with or a part of the interior of a casing string with the fluids discussed above.

In addition to the equipment used for drilling operations, the upstream system 12 may include a number of well devices that may control the flow of hydrocarbons being extracted from the wells 22. For instance, the well devices in the upstream system 12 may include pumpjacks 32, submersible pumps 34, well trees 36, and the like. The pumpjacks 32 may mechanically lift hydrocarbons (e.g., oil) out of the well 22 when a bottom hole pressure of the well 22 is not sufficient to extract the hydrocarbons to the surface. The submersible pump 34 may be an assembly that may be submerged in a hydrocarbon liquid that may be pumped. As such, the submersible pump 34 may include a hermetically sealed motor, such that liquids may not penetrate the seal into the motor. Further, the hermetically sealed motor may push hydrocarbons from underground areas or the reservoir to the surface.

The submersible pump 34 may include electro-submersible pumps (ESPs) that may be submerged in a wellbore and may user an electric motor to drive impellers to lift fluid to the surface. As such, ESPs may be an energy-intensive tool that may have a significant impact in sustainability factors. With this in mind, the environmental impact, particularly in terms of emissions, may largely depend on the source of power or energy provided to the ESP and its sustainability properties (e.g., cleanliness). If the ESPs are powered by renewable energy, the ESPs' emission footprint can be minimized. However, reliance on fossil fuels for power or energy can result in significant carbon emissions. As such, to improve sustainability parameters, ESPs may be integrated with sustainable energy sources to mitigate environmental impact.

The well trees 36 may be an assembly of valves, spools, and fittings used for natural flowing wells. As such, the well trees 36 may be used for an oil well, gas well, water injection well, water disposal well, gas injection well, condensate well, and the like. By way of reference, the wells 22 may be part of a first hierarchical level and the well devices that extract hydrocarbons from the wells 22 may be part of a second hierarchical level above the first hierarchical level.

After the hydrocarbons are extracted from the surface via the well devices, the extracted hydrocarbons may be distributed to other devices via a network of pipelines 38. That is, the well devices of the upstream system 12 may be connected together via a network of pipelines 38. In addition to the well devices described above, the network of pipelines 38 may be connected to other collecting or gathering components, such as wellhead distribution manifolds 40, separators 42, storage tanks 43, and the like.

In some embodiments, the pumpjacks 32, the submersible pumps 34, well trees 36, wellhead distribution manifolds 40, separators 42, and storage tanks 43 may be connected together via the network of pipelines 38. The wellhead distribution manifolds 40 may collect the hydrocarbons that may have been extracted by the pumpjacks 32, the submersible pumps 34, and the well trees 36, such that the collected hydrocarbons may be routed to various hydrocarbon processing or storage areas in the upstream system 12, the midstream system 14, or the downstream system 16. The separator 42 may include a pressure vessel that may separate well fluids produced from oil and gas wells into separate gas and liquid components. For example, the separator 42 may separate hydrocarbons extracted by the pumpjacks 32, the submersible pumps 34, or the well trees 36 into oil components, gas components, and water components. After the hydrocarbons have been separated, each separated component may be stored in a particular storage tank 43. The hydrocarbons stored in the storage tanks 43 may be transported via the pipelines 38 to transport vehicles, refineries, and the like.

In addition to the components described above, internet-of-things (IoT) devices 44 may be distributed throughout the upstream system 12, the midstream system 14, and the downstream system 16 and may collect information, perform analysis on data, send data related to a respective component or parameters (e.g., temperature, flow) of a component to a computing system or the like. By way of example, the IoT device 44 may include sensors, actuators, machines, or other equipment that may include a processor that execute computer instructions and performs certain tasks including collecting data, processing data, and communicating data over a network.

Although the hydrocarbon production system 10 is described above with certain components, it should be understood that the hydrocarbon production system 10 may include additional, fewer, or different components. For example, although discussed above in relation to the hydrocarbon production system 10 on land, present embodiments may also apply to offshore hydrocarbon sites, hydraulic fracturing or fracking operations, and the like.

After extracting, transporting, and storing the hydrocarbons in the upstream system 12, the hydrocarbons may be transported and stored in the midstream system 14. The midstream system 14 may thus include pipeline infrastructure 46 that may move the extracted hydrocarbons across certain terrains and geographic locations to facilities to process, refine, or store the hydrocarbons. The pipeline infrastructure 46 may include similar devices as described in the upstream system 12 such as the separators 42 and storage tanks 43, as well as other components that may assist in moving the hydrocarbons long distances, such as pumping stations, tank trucks 48, rail tank cars, barges 50, and the like. The IoT devices 44 may thus track the flow of the hydrocarbons, the valves for directing the hydrocarbons within the pipelines, the locations of the vehicles used to transport the hydrocarbons, and the like. In some embodiments, the IoT devices 44 may include autonomous control systems to control the operations of the vehicles transporting the hydrocarbons.

The downstream system 16 may include components that may convert the transported hydrocarbons into final petroleum or gas products. The operations performed by the downstream system 16 may include refining the hydrocarbons into different products such as gasoline, diesel, oils, lubricants, petrochemicals, and the like. As such, the downstream system 16 may include a refinery system 52 for processing the hydrocarbons. By way of example, the refinery system 52 may include distillation towers to separate the hydrocarbons, heat exchangers to transfer heat between different fluids, pumps used to move fluids, reactors to perform chemical reactions for processing the hydrocarbons, separators 42, compressors, storage tanks, and the like. After the hydrocarbons are converted into hydrocarbon products, they may be transported to other locations for distribution via tank trucks 48 or other suitable distribution mechanisms. For instance, the hydrocarbon products (e.g., gasoline) may be distributed to a fuel station to distribute fuel to consumers via a gas pump 54.

In addition to the upstream system 12, the midstream system 14, and the downstream system 16, the enterprise may include buildings 56, vehicles 58, and other objects that are owned, leased, or operated by an organization. These tangential or supplemental objects may be involved in the planning, marketing, accounting, and supplementary business aspects for commercializing the hydrocarbon production system 10. Although only the buildings 56 and vehicles 58 are depicted as supplementary objects associated with the enterprise in FIG. 1, it should be understood that other supplementary objects may also be considered part of the enterprise.

Each of the components and subsystems of enterprise described above (e.g., the upstream system 12, the midstream system 14, the downstream system 16, office building 56) involves the consumption of resources such as energy and water. Further, these systems also produce a certain amount of waste greenhouse gas (GHG) emissions while performing their respective operations. The resource, waste, and emission amounts vary for different portions of each respective system, but the aggregated resource, waste, and emission amounts may include a planning phase (e.g., within building 56), a construction phase, an operation phase, a decommissioning phase, and the like. In addition, each of these phases at each system level (e.g., upstream, midstream, downstream, office) produces greenhouse gas (GHG) emissions such as carbon dioxide, methane, and the like. The resources, waste, GHG emissions, and other byproducts consumed and produced during these operations may be referred to as sustainability parameters.

Enterprises may generally move to improve sustainability parameters by focusing on one or more of increasing energy efficiencies, reducing water usage, curbing GHG emissions, decreasing waste amounts, and the like. The sustainability parameters may be interdependent with each other, and the enterprise may reduce the environmental impacts of their operations by coordinating their operations to improve the aggregate sustainability parameters across the enterprise. As shown in FIG. 1, any type of enterprise may involve a diverse group of equipment, processes, structures, and the like. In accordance with the embodiments described herein, a sustainability platform system may track and monitor sustainability parameters across the variety of levels, operations, and aspects of the enterprise to provide sustainability action plans to revise enterprise operations and structures to improve sustainability parameters. Indeed, as more industries move to achieve net zero compliance in which the enterprise achieves a balance between the amount of GHG emissions produced by the enterprise operations and removed from the atmosphere, efficient generation of efficient action plans for reduced GHG emissions and other sustainability operations may be increasingly important.

Keeping this in mind, the present embodiments described herein may include systems and methods for improving sustainability operations across enterprise operations. For example, a data flow diagram 70 of operations performed by a sustainability platform system 70 is presented in FIG. 2. The data flow diagram 70 may use inputs from data sources to generate sustainability action plans to adjust operations and/or procedures within an enterprise to improve sustainability parameters. Although the data flow diagram 70 illustrates a set of input data sources 74, a methodology 76, and a set of engineering workflow systems 78, it should be noted that the elements illustrated in FIG. 2 do not constitute an exhaustive list of elements that may be part of the data flow diagram 70 and used to perform the methods described herein. Instead, the depicted elements are merely provided as examples to provide context and to supplement the explanation of the embodiments described herein.

Figure 2:
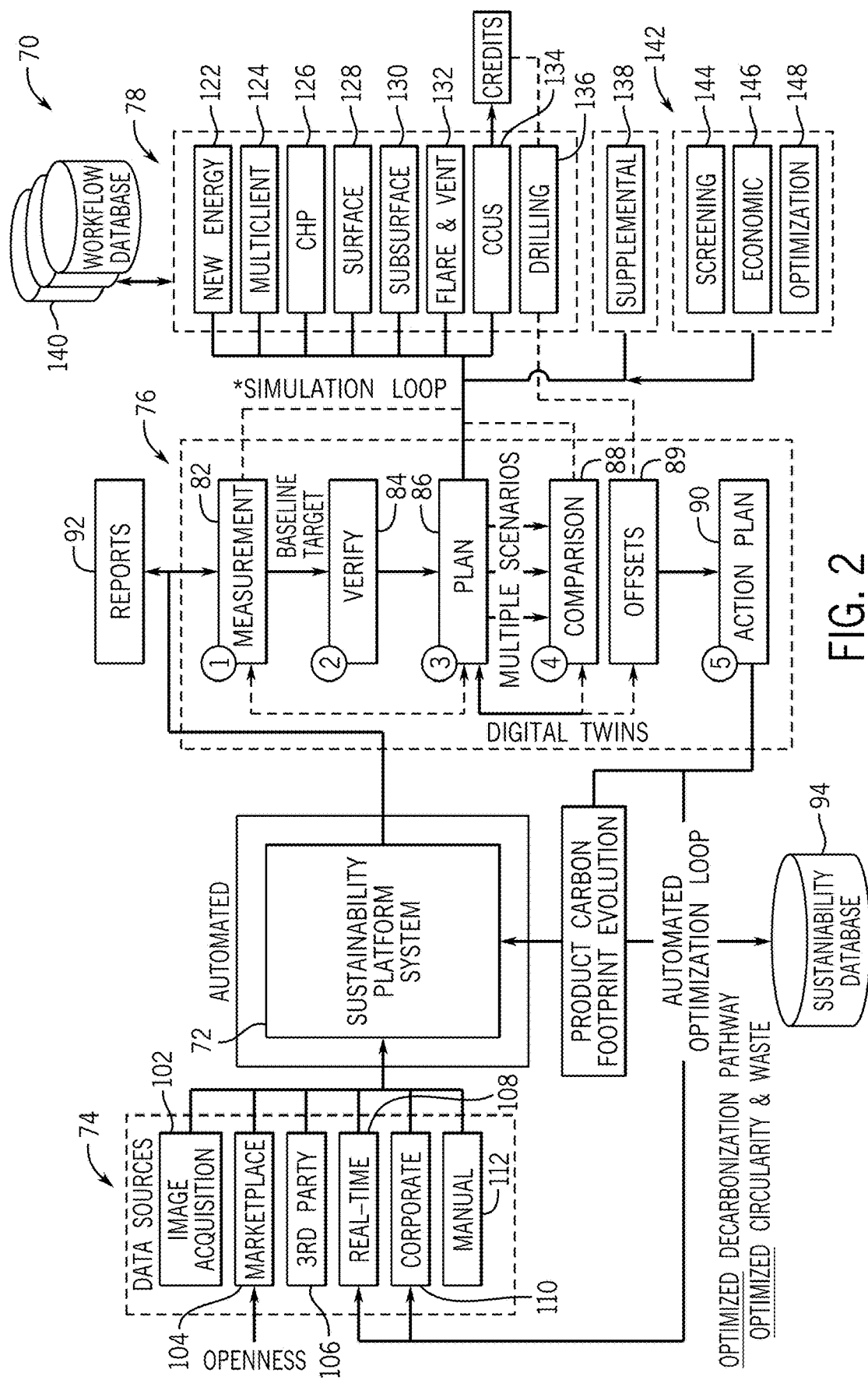
FIG. 2 is a data flow diagram in which inputs from data sources are used to generate workflow plans to adjust operations and/or procedures within an enterprise to improve sustainability parameters, according to one or more embodiments of this disclosure.

Referring now to FIG. 2, the sustainability platform system 72 may include any suitable computing device, cloud-computing device, or the like and may include various components to perform various analysis operations. By way of operation, the sustainability platform system 72 may receive input data regarding measured sustainability parameters, policies for sustainability programs, and other information from a set of input data sources 74. Based on the input data, the sustainability platform system 72 may perform certain calculations, analyses, or operations to track sustainability parameters across enterprise operations, report the sustainability parameters with respect to legislative policies or regulations, identify relationships between operational parameters for facilities, devices, and other components that are part of the enterprise and the measured sustainability parameters, and the like.

In some embodiments, the sustainability platform system 72 may implement the methodology 76 that may include a measurement block 82, a verification block 84, a planning block 86, and a comparison block 88. After receiving input data, analyzing the input data with respect to the engineering workflow systems 78, the sustainability platform system 72 may generate one or more action plans 90 that may detail operational changes for facilities, machinery, and the like. After the action plans 90 are put in place within the enterprise operations, the sustainability platform system 72 may again receive the input data to determine the effectiveness of the action plans 90, provide improved action plans 90, and continuously improve the sustainability parameters across the enterprise operations for the life of the enterprise.

Generally, the measurement block 82 may receive the input data and store the related measurements, values, and other measurable parameters in a storage component, data store, or the like. In some embodiments, the measurement block 82 may prepare or organize the measurement data in accordance with specific protocols or formats, as defined by reports 92. The reports 92 may include previous reports prepared for different authorities or organizations. As such, the reports 92 may also include metadata related to the format, structure, and type of information presented in the reports 92. In some embodiments, the reports 92, the metadata regarding the reports 92, instructions regarding the preparation or formatting of the reports 92 may also be stored in a database or data storage for access by the sustainability platform system 72.

The measurement data recorded by the measurement block 82 may be validated by the verification block 84. That is, the verification block 84 may analyze or query other input data to verify that the recorded measurement data is accurate. For example, the measurement block 82 may receive a measurement from the IoT device 44 regarding some sustainability parameter, such as energy consumption. The verification block 84 may retrieve corporate energy invoices to determine whether the energy consumption measured by the IoT device 44 corresponds to the energy consumed according to the utility providing the energy.

The planning block 86 may use the verified measurement data to query the engineering workflow systems 78 to generate one or more potential action plans or scenarios for improving the sustainability parameters. The engineering workflow systems 78 may include a number of distinct modules or systems that provide recommendations (e.g., equipment recommendation, operational change recommendation) for various portions of the enterprise to improve distinct aspects of sustainability or gain insight to better determine a plan for improving sustainability parameters across the enterprise. For instance, the engineering workflow systems 78 may include a new energy system that tracks new energy sources that may be used to meet the energy requests of various portions of the enterprise. The new energy sources may include renewable energy sources to improve the sustainability parameters for the enterprise operations. As such, the new energy system may determine whether alternative energy sources can be used to replace energy sources that may be less sustainable.

After generating a number of potential plans or scenarios, the comparison block 88 may analyze the collection of potential plans to determine whether plans could be combined, provide comparison data for different sustainability parameters associated with the generated plans, and the like. Additionally, in some embodiments, an offset block 89 may augment the potential plans to form an action plan 90. For example, carbon credits 91 (e.g., purchased or created via carbon capture) may be factored into the comparison and evaluation of potential plans to achieve goals of an action plan 90. The comparison data may be presented to a user via an electronic display or any suitable display technology. In some embodiments, the plans or comparison data may be sent to user devices (e.g., mobile phone) and may cause the user devices to automatically open or execute an application associated with the sustainability platform system 72, such that the user device presents visualization related to the determined plans, the comparison data, or the like. In some embodiments, the visualizations may be selectable input fields in which the user may touch or select via an input device (e.g., keyboard, mouse). After receiving a selection that corresponds to the action plan 90, the sustainability platform system 72 may send the action plan 90 to other user devices, a sustainability database 94, or other suitable recipient, such that the enterprise may make changes to its operations to implement the recommendations outlined in the action plan 90. In some embodiments, the sustainability platform system 72 may send commands to equipment (e.g., lights, pumps, wellheads, artificial lifts), such as via IoT devices 44, to adjust operations based on the recommended action plan 90 to improve the sustainability parameters associated with the enterprise.

Referring now to the input data sources 74, in some embodiments, the sustainability platform system 72 may receive data from image acquisition sources 102, marketplace sources 104, third party-sources 106, real-time sources 108, corporate sources 110, manual sources 112, and the like. The image acquisition sources 102 may include devices that may acquire image data (e.g., pictures, video, infrared image) using any suitable image sensor. As such, the devices may include satellites, drones, infrared sensors, cameras, and the like. The image data provided by the image acquisition sources 102 may correspond to heat dissipating from a device, gas leaking from a device, emissions (e.g., fumes, height of fumes) produced by a device, or any other suitable image data that may provide information related to any suitable sustainability parameter. In some embodiments, the sustainability platform system 72 may determine an approximate amount of emissions based on the image data. Although the determined amount may not be precise, the measurement block 82 may use the initial estimate as a data point and use other data points to verify via the verification block 84 using other data.

The marketplace sources 104 may include data provided by analysis software, crowdsourcing systems, and other data sources that may be facilitated by a marketplace such as the Ocean Store provided by Schlumberger and other like sources. That is, the marketplace sources 104 may include data provider sources or services that capture, generate, or simulate certain datasets (e.g., emissions, waste, water usage, energy consumption) for use by the sustainability platform system 72 as ready-made data. For instance, emissions data may be provided by certain marketplace sources 104 that may be able to broadcast or present their available data services for integration with the sustainability platform system 72 via an integration tool, a network location, the sustainability platform system 72 itself, or the like. The supplied data (e.g., emissions data) may be incorporated for calculation purposes, analysis purposes, simulation purposes, or the like. Indeed, the data provided via the marketplace sources 104 may include emission factors from various sources such as IPCC, IEA, EIA, and the like, as well as publicly available frameworks such as TCFD, GHG protocol, and the like. In some cases, the marketplace sources 104 may provide data services for a fee (e.g., subscription) and may coordinate data exchange via the sustainability platform system 72 to enhance the data analysis operations while employing solutions provided by the engineering workflow systems 78 and the like.

As such, different insights with regard to the received data may be determined or gleaned by the sustainability platform system 72 based on the software modules or solutions provided via the marketplace sources 104. In addition to the examples provided above, the marketplace sources 104 may provide virtual metering data to provide an estimated flow amount for a pump. That is, an application or tool may be provided by the marketplace sources 104 that uses an efficiency of the pump to determine a virtual amount of flow of fluids via the pump based on the amount of time that the pump was operating. Although the present disclosure describes certain exemplary services that may be received via the marketplace sources 104, it should be understood that the marketplace sources 104 may be provided by any suitable application, data system, or other component that may interact and exchange information with the sustainability platform system 72.

The third-party sources 106 may include supplier information provided by a manufacturer or other entity regarding a device, system, facility, or the like. Using the pump example mentioned above, the third-party sources 106 may provide a datasheet or operational data that details the efficiency, energy consumption rate, and other information related to the operation of the pump. In addition, third-party sources 106 may correspond to data sources that may be utilized by the sustainability platform system 72 to perform various operations via the planning block 86, in coordination with the engineering workflow systems 78, and the like. By way of example, the third-party sources 106 may include data service providers that perform independent research and business intelligence analysis such as Rystad, Gartner, Statista, and the like. In addition, data projections for different organizations may be provided via the marketplace sources 104 as these organizations acquire these data projections (e.g., OPEX/CAPEX) such as historical emission figures, geographies of areas for operation, number of present facilities, number of fields, and the like. Although the present disclosure describes certain exemplary services that may be received via the third-party sources 106, it should be understood that the third-party sources 106 may be provided by any suitable application, data system, or other component that may interact and exchange information with the sustainability platform system 72.

The real-time sources 108 may include data provided by sensors, devices, and other data sources via a network connection. As such, the real-time sources 108 may include the IoT devices 44, as well as any smart component that may be part of the enterprise. In addition, the real-time sources 108 may include routers and other data collection point devices that may receive data (e.g., sensor data) from other systems, computing devices, instruments, and the like.

The corporate sources 110 may include data provided by corporate entities associated with the enterprise or other organization. For instance, many enterprises may use enterprise resource planning (ERP) software systems to assist in coordinating and tracking business operations such as finance, human resources, field operations, manufacturing, production, supply chain, procurement, customer service, and any other suitable business operation. The corporate sources may also include memorandums, company earnings reports, sustainability reports, and other publications provided by the enterprise that may describe various operations, goals, and finances associated with the enterprise. In some embodiments, the corporate sources 110 may provide an ERP report that details employees that work in a facility, the addresses associated with the employees, the schedules of the employees, the salary information for the employees, the utility invoices for the buildings accessed by the employees, and the like. This information may enable the sustainability platform system 72 to measure emissions related to the enterprise operations to generate insights regarding priorities to address. Further, the information may be used to provide action plans 90 at a facility level, such as recommending changes to work schedules that may encourage work from home days to offset sustainability liabilities in different parts of the enterprise.

With this in mind, the action plans 90 may include providing recommendations to improve energy efficiency measure within the building 56 by installing energy-efficient lighting systems, employing sensors that adjust lighting based on occupancy, upgrading or controlling HVAC systems, and the like. In addition, the building 56 may integrate renewable energy sources such as solar panels, wind farms, and the like, in addition to purchasing renewable energy credits or the like. In some embodiments, the action plans 90 may include adjusting light operations, HVAC operations, or both within the building 56.

In the same manner, the action plans 90 may include implementing water-saving fixtures (e.g., faucets, toilets) to conserve water resources. Moreover, rainwater may be harvested using landscaping irrigation, water storage components, and the like. In addition, water irrigation operations for landscaping surrounding the building 56 may be adjusted based on the sustainability parameters and embodiments described herein.

Additionally, as mentioned above, work schedules may be modified to modify employee office visits to reduce the carbon emissions related to commuting to the office. Further, large capacity transportation vehicles may be commissioned by the enterprise to employ high-occupancy vehicles that travel to employees' homes in a particular area to commute the employees to and from the building 56. As such, the action plans 90 may involve coordinating with ride-share services and other applications to facilitate the commutes. That is, the action plans 90 may engage (e.g., send requests) computing devices or servers for ride share applications to coordinate pick up of employees that are co-located within a same area or location (e.g., based on receiving location data from user devices) during a time period.

The manual sources 112 may include any data manually provide to the sustainability platform system 72 via user input or the like. For instance, the sustainability platform system 72 may provide a user interface that solicits inputs from a user regarding various parts of the enterprise operations. The user input may be provided to the sustainability platform system 72 and used for generating the action plans 90 via the methodology 76.

Referring now to the engineering workflow systems 78, the sustainability platform system 72 may employ one or more of the engineering workflow systems 78, independently or in combination with one or more other systems, to determine recommendations for changing enterprise operations. As used herein, enterprise operations may include any building, operation, task, or activity related to the products and services produced by the enterprise. As such, for example, the enterprise may include any of the activities related to those described above with respect to the hydrocarbon production system 10 from the upstream system 72 to operations related to the function of the building 56. In this way, the sustainability platform system 72 may holistically evaluate an overall sustainability for the enterprise operations and determine effective and creative solutions to achieve net zero goals.

Each of the engineering workflow systems 78 may perform specific analysis operations to determine solutions for the respective technology areas. That is, the engineering workflow systems 78 may assist with the designing and monitoring of abatement solutions (e.g., emission abatement, waste abatement, etc.). As such, each engineering workflow system 78 may include a separate computing device, cloud system, or the like that independently analyzes data and produces outputs. Each engineering workflow system 78 may thus send queries for information or data to the sustainability platform system 72, which may serve as data intermediary to assist each engineering workflow system 78 in retrieving relevant information to allow the respective engineering workflow system 78 to perform its analysis. In the same manner, the sustainability platform system 72 may query one or more engineering workflow systems 78 to retrieve solutions, analysis, recommendations, or the like to determine action plans to improve sustainability parameters. Although the following discussion of the types of the engineering workflow systems 78 include a certain number of systems, it should be noted that additional systems may also be part of the engineering workflow systems 78.

As shown in FIG. 2, the engineering workflow systems 78 may include a new energy system 122, a multiclient system 124, a combined heat and power (CHP) system 126, a surface system 128, a subsurface system 130, a flare and vent system 132, a carbon capture system 134, a drilling system 136, and a supplemental system 138. As mentioned above, each of the engineering workflow systems 78 may coordinate operations with the sustainability platform system 72 to perform the methodology 76 and generate action plans 90. However, by using different modules or systems to analyze different aspects of engineering, the present embodiments described herein enable the sustainability platform system 72 to preserve computing resources for coordination and integration operations (e.g., collection and transmission of data, organizing plans, coordinating feasibility of different plans for enterprise) between the input data sources 74 and the engineering workflow systems 78 without analyzing different engineering solutions for sustainability improvements. It should be noted that each of the engineering workflow systems 78 may be complex systems that operate on their own respective platforms (e.g., processing systems, storage components, network connections) to perform various types of data analysis, operations, simulations, and the like. In addition, the output data provided by these engineering workflow systems 78 or used by the same may be stored for use by various entities in workflow databases 140 or other suitable storage component.

By way of example, the new energy system 122 may track, monitor, simulate, and design solutions for various industries to achieve more sustainable energy goals. The new energy system 122 may receive invoice data for energy costs associated with the enterprise (e.g., corporate data source 110), real-time energy usage from IoT devices (e.g., real-time data sources 108), and other relevant data regarding the energy consumption data for various aspects of the enterprise. The energy consumption data may include utility provider information that indicates the source of the energy (e.g., coal, renewable), a rate schedule for the provided utilities, and the like. The new energy system 122 may also include databases or storage components that include models that represent other enterprise or facility operations, simulated models generated by artificial intelligence (e.g., neural networks, pattern analysis), machine learning algorithms, or the like. The models or lookup tables may provide information related to the amount of energy provided to different enterprises, the type of energy provided to these enterprises, the costs associated with commissioning these energy sources, and the like. For instance, the new energy system 12 may model the ability of wind farms and solar panel fields to provide energy for one or more facets of a particular enterprise. Alternative sources may also include renewable energy options such as solar power, wind power, hydroelectric power, hydrogen, geothermal energy, biomass, and other suitable alternative energy sources. The model may also include cost projections for commissioning these energy sources, as well as projections over the life of the enterprise. These models may be employed by the sustainability platform system 72 to determine action plans to apply to its respective input data related to the respective enterprise and identify action plans 90 that may assist in improving energy sustainability parameters for the enterprise. In addition to providing alternative energy sources, the new energy system 122 may also provide recommendations with regard to storing energy in batteries, storing hydrogen for later use, storing geothermal energy for use, and the like.

The combined heat and power (CHP) system 126 may perform analysis to determine methods for reusing emissions such as carbon dioxide to increase efficiency. For instance, heat can be recaptured during a portion of a process and the heat can be applied to a heat exchanger to produce energy or perform some other function using the heat recaptured from performing another process within the enterprise. As such, the CHP system 126 may request image data and infrastructure or design data for facilities of the enterprise from the sustainability platform system 72 to identify process components that may produce heat or power that may be recaptured and recycled for other functions within the enterprise. In any case, the CHP system 126 may help the sustainability platform system 72 determine action plans 90 that improve energy efficiency and reduce facility carbon emissions.

The multiclient system 124 may include data analysis systems from other sources. Indeed, these sources may provide information related to the operations of the enterprise that may be gleaned from the input data received by the sustainability platform system 72 but may not be determined by the sustainability platform system 72.

The surface system 128 may include computing systems and databases of information that details operational data regarding various types of equipment that may be installed on the surface of the hydrocarbon production system 10. As such, the surface system 128 may continuously update its data sources to track updated versions of components, identify replacement parts and products for components, track efficiency improvements of components, monitor recalls or issues with installed components, and the like. The surface system 128, for example, may receive real-time data via the sustainability platform system 72 and determine that certain pieces of equipment are operating inefficiently, are reaching an end of life, has a more energy efficient counterpart available, or the like. The sustainability platform system 72 may coordinate with the surface system 128 to identify replacements, new components to add to the enterprise, and the like to improve the sustainability parameters of the enterprise operations.

In the same manner, the subsurface system 130 may include computing systems and databases of information regarding equipment that may be part of subsurface operations in the hydrocarbon production system 10. As such, the subsurface system 130 may provide recommendations with regard to improved data acquisition processes, techniques, equipment, and the like that may enable the enterprise to improve sustainability parameters. By way of example, the subsurface system 130 may determine improved seismic data acquisition techniques that consume less energy as compared to previous techniques using existing equipment in the enterprise.

The flare and vent system 132 may provide recommendations with regard to flaring and venting excess emissions. In some embodiments, the excess emissions may be captured using carbon capture technology. As such, the flare and vent system 132 may coordinate with the carbon capture (CCUS) system 134 to determine carbon capture technology for storing captured carbon. The CCUS system 134 may provide data regarding costs, installation profile, and operations for carbon technology and recommendations with regard to injecting the captured carbon into appropriate locations. In some embodiments, captured carbon may not be useful for a particular enterprise but may be useful for other enterprises. As such, the CCUS system 134 may identify the industries or organizations that may use the captured carbon in an efficient manner.

The drilling system 136 may provide recommendations with regard to drilling operations for creating boreholes, wells, and the like. The drilling operations may include equipment information, slurry makeup, drilling fluids, water conservation operations, and the like. Further, the supplemental system 138 may include recommendations for other industries, suppliers, distributors, or consumers associated with the enterprise. For instance, the supplemental system 138 may include gasoline distribution facilities with gas pumps 54 that provide gasoline to consumers. The supplemental system 138 may provide information with regard to improving sustainability parameters for operations that occur between the enterprise associated with the sustainability platform system 72 and the organization operating the gasoline distribution facilities.

In addition to the engineering workflow systems 78, strategy level planning systems 142 may interact with the sustainability platform system 72 to perform strategic planning operations for determining sustainability action plans 90, performing screening analysis, determining economic aspects of the action plans 90, determining optimization functions for the action plans 90, and the like. That is, the strategy level planning systems 142 may evaluate an organization's sustainability operations at various hierarchical levels to perform some strategic planning for certain operations, such as performing decarbonization operations. By way of example, the strategy level planning systems 142 may include screening systems 144, economic systems 146, optimization systems 148, and other systems that may analyze the feasibility and viability of implementing certain sustainability action plans 90.

With this in mind, the strategy level planning systems 142 may perform materiality assessment to provide the enterprise with an opportunity to analyze risks and opportunities associated with implementing the action plans 90, and to make any adjustments necessary to improve its business strategy. The assessment helps the organization understand where it is creating or reducing value for society and represents a comprehensive business case to senior executives about why and how to report ESG (environmental, social, governance) data and manage ESG performance. The information obtained and tracked on the platform may essentially help companies in this decision-making process towards their decarbonization strategy. With clear visibility across all 3 scopes (e.g., environmental, social, governance), materiality assessment would be facilitated. In this way, the strategy level planning system 142 may enable the sustainability platform system 72 to review action plans 90 with respect to government variable, risk management variable, target metrics, and the like.

In some embodiments, the strategy level planning systems 142 may perform evaluation operations based on organizational boundaries and operational boundaries. Organizational boundaries may determine operations that are operated and owned or controlled by the enterprise and thus are included in inventory analysis. The organizational boundaries may account for emissions according to an equity share in the enterprise associated with the respective operations (e.g., equity share approach) or with respect to the aspects of the enterprise that the enterprise may control (e.g., control approach). By way of example, the control approach may include financial control or operational control.

Operational boundaries determine which operations and sources generate emissions, associate sources for emissions, and explanations with regard to how the sources are classified. In some cases, the operational boundaries may attribute emissions as direct emissions and indirect emissions. With this in mind, certain organizations evaluate sustainability by tracking their emissions effectively as direct emission and indirect emissions. This tracking may help the sustainability platform system 72 understand hotspots for the enterprise and subsequently develop carbon footprint reduction plans and subsequent business strategy/future investment. In this way, the sustainability platform system 72 may help companies across a wide range of solutions in the hard-to-abate industries starting from measuring emissions to verifying and reporting. Subsequently, the sustainability platform system 72 may help them in their decarbonization pathway through the engineering capabilities accessible via the platform as described herein.

In some embodiments, the screening system 144 may perform some technical analysis with respect to overall or high-level system perspectives to determine a relative effectiveness of implementing or conducting sustainability improvement operations on the enterprise. The screening system 144 may then use the high-level analysis to coordinate with other engineering workflow systems 78 to determine suitable action plans 90 that may be beneficial for the enterprise.

In the same manner, the economic system 146 may provide economic or financial data related to the operational costs of the enterprise, economic considerations for improving sustainability parameters for the enterprise, and the like. In this way, the economic system 146 may provide some insight into economic cost benefits for implementing certain action plans 90. In addition, the economic system 146 may coordinate with engineering workflow systems 78 to assess costs for performing certain tasks and/or for determining the economic feasibility of certain action plans 90.

The optimization system 148 may determine or analyze optimization parameters for performing certain action plans 90. For instance, the optimization system 148 may determine optimization parameters for reducing cost per carbon in decarbonization plans. In any case, the strategy level planning systems 142 may assist the sustainability platform system 72 to perform economic analysis to perform operations, such as selecting action plans 90, engaging engineering workflow systems 78, selecting input data sources 74, and the like when determining or implementing action plans 90 or performing other suitable operations.

By coordinating the various components described in FIG. 2 and throughout the application, the sustainability platform system 72 may provide a seamless integration and understanding with ESG scoring and reporting tools, which are designed to assess and measure the sustainability and societal impact of companies and investments. As such, the sustainability platform system 72 may help organizations evaluate their performance in key ESG areas and provide transparent reporting to stakeholders.

Further, it should be noted that although the embodiments described herein are detailed with respect to existing enterprise operations, in some embodiments, the sustainability platform system 72 may be used in earlier phases of business development such as field development planning. That is, field development planning may include facility and infrastructure planning operations for building new facilities in various industries. The sustainability platform system 72 and the methods described herein may be incorporated into the field planning operations to account for sustainability parameters in the field development plans.

It should be noted that the sustainability platform system 72 illustrated and described above with respect to FIG. 2 corresponds to one embodiment in which the sustainability platform system 72 may be implemented. However, the sustainability platform system 72 may also be implemented in accordance with other structures. For instance, the engineering workflow systems 78 may be part of the sustainability platform system 72 as a layer for performing analysis operations. The sustainability platform system 72 may also include other layers of operations such as digital foundation services, data infrastructure, and the like. It should be noted that while certain aspects of FIG. 2 are shown as individual elements for data flow purposes, there may or may not be a physical, logical, and/or computational distinction therebetween. For example, in some embodiments, the sustainability platform system 72 may be considered as distinct from or to include the at least a portion of the engineering workflow systems 78, at least a portion of the sustainability database 94, at least a portion of the workflow database 140, and/or at least a portion of the input data sources 74.

Figure 3:
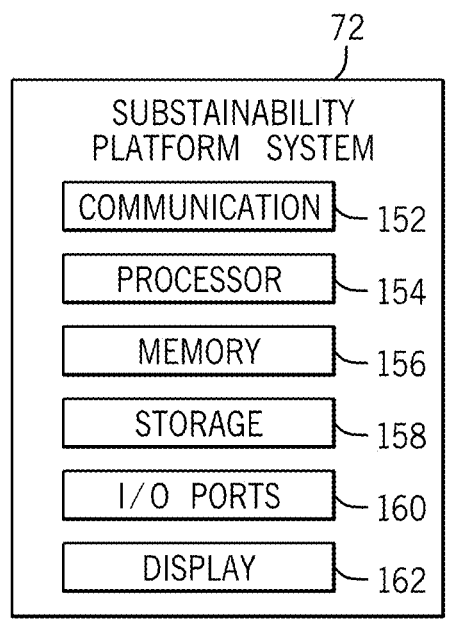
FIG. 3 is a block diagram of components that may be part of the sustainability platform system, according to one or more embodiments of this disclosure.

To perform the operations described herein, the sustainability platform system 72 may include a number of components to assist in processing, analyzing, collecting, and communicating data in accordance with the presently disclosed embodiments. With this in mind, FIG. 3 illustrates example components of the sustainability platform system 72. As shown in FIG. 3, the sustainability platform system 72 may include a communication component 152, a processor 154, a memory 156, a storage component 158, input/output (I/O) ports 60, a display 162, and the like. The communication component 152 may be a wireless or wired communication component that may facilitate communication between different monitoring systems, gateway communication devices, various control systems, and the like. The processor 154 may be any type of computer processor or microprocessor capable of executing computer-executable code. The memory 156 and the storage component 158 may be any suitable articles of manufacture that can serve as media to store processor-executable code, data, or the like. These articles of manufacture may represent non-transitory computer-readable media (i.e., any suitable form of memory or storage) that may store the processor-executable code used by the processor 154 to perform the presently disclosed techniques. The memory 156 and the storage component 158 may also be used to store data received via the I/O ports 160, data analyzed by the processor 154, or the like.

The I/O ports 160 may be interfaces that couple to various types of I/O modules such as sensors, programmable logic controllers (PLC), and other types of equipment. For example, the I/O ports 160 may serve as an interface to pressure sensors, flow sensors, temperature sensors, and the like. As such, the sustainability platform system 72 may receive data associated with a well via the I/O ports 160. The I/O ports 160 may also serve as an interface to enable the sustainability platform system 72 to connect and communicate with surface instrumentation, servers, and the like.

The display 162 may include any type of electronic display such as a liquid crystal display, a light-emitting-diode display, and the like. As such, data acquired via the I/O ports and/or data analyzed by the processor 154 may be presented on the display 162, such that the sustainability platform system 72 may present designs for hydrocarbon sites (e.g., of a hydrocarbon production system 10) for view. In certain embodiments, the display 162 may be a touch screen display or any other type of display capable of receiving inputs from an operator. Although the sustainability platform system 72 is described as including the components presented in FIG. 3, the sustainability platform system 72 should not be limited to including the components listed in FIG. 3. Indeed, the sustainability platform system 72 may include additional or fewer components than described above.

Figure 4:
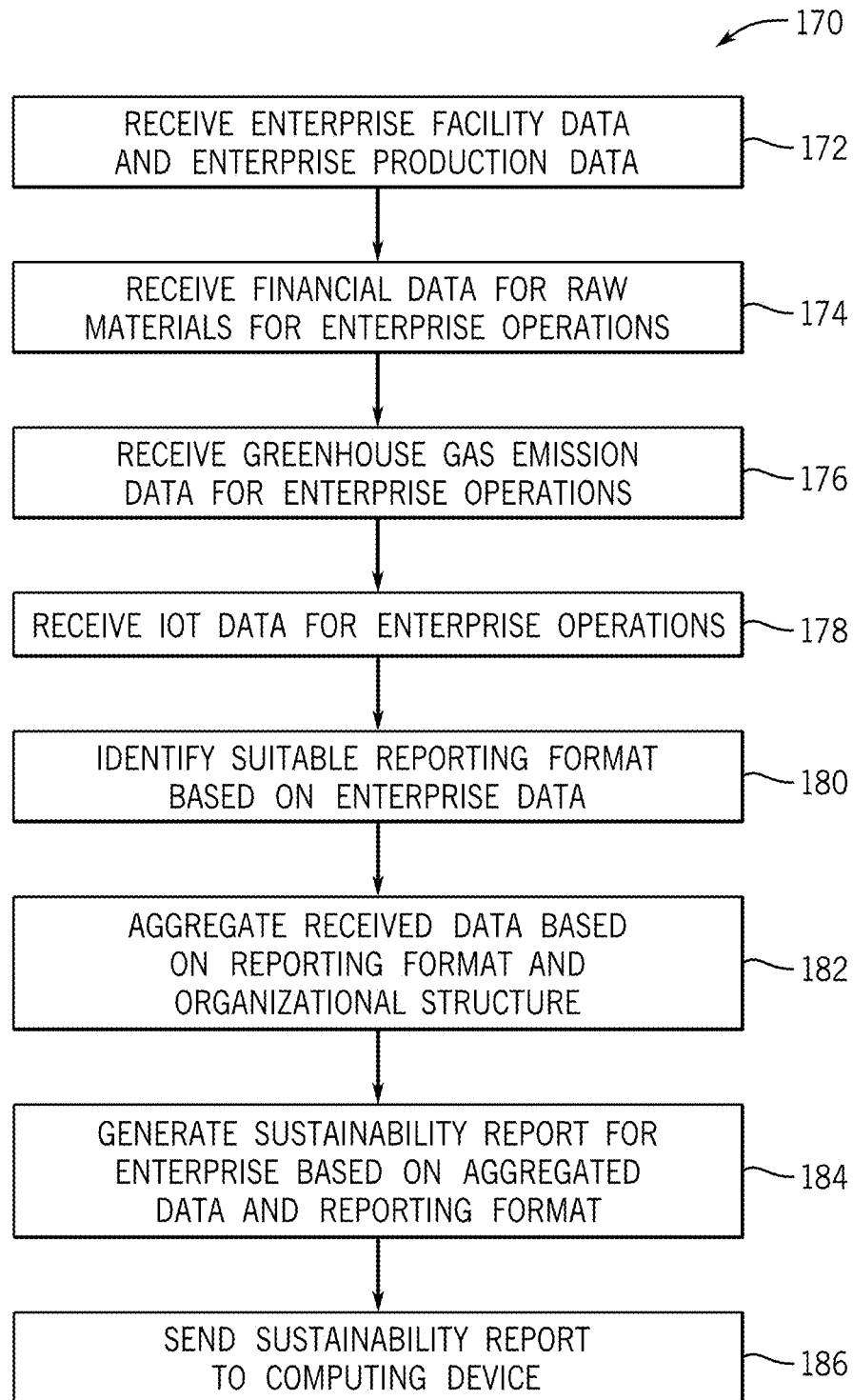
FIG. 4 is a flow chart of a method for generating sustainability reports for enterprise operations employing the sustainability platform system of FIG. 3, according to one or more embodiments of this disclosure.

With the foregoing in mind, FIG. 4 illustrates a method 170 for generating a sustainability report for enterprise operations in accordance with embodiments presented herein. Although the following description of the method 170 is described as being performed by the sustainability platform system 72 and in a particular order, it should be understood that any suitable computing system with access to the appropriate data sources and engineering workflow systems may perform the method 170 in any suitable order.

Referring now to FIG. 4, at block 172, the sustainability platform system 72 may receive enterprise facility data and enterprise production data. The enterprise facility data may include information regarding the structures owned, leased, or used by the enterprise. As such, the facility data may include information related to the building 56, such as the type of light bulbs employed it the building, the type of heating/venting and air conditioning (HVAC) systems employed at the building 56, the business hours of the building 56, irrigation schedules outside the building 56, and the like. In some embodiments, the facility data may be provided via the corporate data sources 110.

In some embodiments, the facility data may include operational schedules for various equipment within or outside the building 56. For instance, the operational schedules (e.g., when activated/deactivated) for the various equipment, such as the HVAC systems, irrigation systems (e.g., for landscape), plumbing systems, lighting equipment, and the like, may be provided along with communication information related to accessing control systems for controlling the equipment. As such, the sustainability platform system 72 may retrieve the current operational schedules directly from the respective control system and send commands to the respective control systems to modify the respective operations, operational schedules, or the like.

The enterprise facility data may also include invoice or financial information related to the costs or resource consumption of the buildings 56. For instance, the facility data may include energy costs, type of energy used, water consumption data, waste costs, and the like as gleaned from invoices provided to the enterprise. In addition, the enterprise facility data may include real time data from IoT devices 44 that may monitor resource consumption data such as watt-hours, water flow (e.g., via flow meters), waste weight (e.g., measured with a networked scale before waste removal services, waste compaction size), and the like.

In some embodiments, the facility data may include energy usage data including an amount of energy (e.g., electricity, gas, kilowatt hours) consumed within the building 56 over a period of time. In addition, the energy usage data may include measurements from energy sensors and other IoT devices that may be within the building 56, smart meters associated with the building 56, and the like. With this in mind, the energy usage data may provide information with regard to energy usage at various hierarchical levels, such as energy usage associated with a floor of the building 56, within a portion of the building 56, outside of the building 56, in common areas of the building 56, and the like. The energy usage data may provide information for the sustainability platform system 72 to use to determine real-time and expected sustainability parameters associated with employees being present at the building 56.

In some embodiments, the enterprise facility data may include operational schedules for employees such as days that the employee works in the office, days that the employees work from home, addresses of employees, types of transportation utilized by employees, and the like. In this way, the employee travel to the buildings may be accounted for in the sustainability parameters. Moreover, cost-benefit analysis with regard to evaluating sustainability parameters associated with employees working in the office 56 versus working from home may be determined by the sustainability platform system 72.

The enterprise production data may include information regarding processes and systems employed for manufacturing, processing, and producing products for the enterprise. In the hydrocarbon production system 10 example above, the enterprise production data may include information related to the equipment in each facility used to extract, transport, store, process, and distribute hydrocarbons. As such, the information may also include operational information with regard to the manner in which the equipment is operated or used, the arrangement of the equipment, the emissions of the equipment, and the like.

In some embodiments, the equipment may provide data in real time using IoT devices 44 or directly communicating with the sustainability platform system 72. The real time data may include temperature data, energy consumption data, water consumption data, waste production data, run time, operational schedules (e.g., times equipment is operating), and the like. In addition, the enterprise production data may include cost or invoice data for raw materials, energy, waste disposal, and the like.

It should be noted that the description of the enterprise facility data and the enterprise production data may include other data types not listed above. However, in general, the enterprise production data may provide data related to the sustainability parameters associated with performing core manufacturing or production processes. On the other hand, the enterprise facility data may correspond to data related to support services for performing business and engineering tasks associated with planning, preparing, and distributing products produced by the production operations of the enterprise.

At block 174, the sustainability platform system 72 may receive financial data for raw materials used for enterprise operations. The enterprise operations may include maintaining business and production operations related to the enterprise facility data and the enterprise production data. The raw materials may include energy consumption, water usage, waste services, and other sustainability parameters. The financial data may provide information regarding invoices, rates for energy consumption, and the like. In some embodiments, the financial data may also include costs related to sustainability equipment, such as carbon capture technology, used to improve sustainability parameters.

At block 176, the sustainability platform system 72 may receive greenhouse gas (GHG) emission data for the enterprise operations. The GHG emission data may be provided by or determined based on real time data acquired by real-time sources 108, the image acquisition sources 102, corporate sources 110, manual sources 112, and the like. In some embodiments, the marketplace sources 104 and the third-party sources 106 may provide information related to the GHG emission data. That is, these sources may model or generate expected GHG emission data for the enterprise operations based on simulations, monitored data, or the like.

At block 178, the sustainability platform system 72 may receive IoT data for the enterprise operations from any suitable IoT device 44. As such, the IoT data may represent real time data regarding current operational and consumption parameters for devices within a structure of the enterprise, equipment used within the enterprise, and the like. The IoT data may provide insight into equipment and facility devices that may be adjusted to improve sustainability parameters for the enterprise. Moreover, the IoT data may provide feedback data with regard to how implemented action plans 90 are affecting the sustainability parameters for the enterprise.

By way of example, the data collected at blocks 272-278 may include information regarding operations various equipment, operations, or the like. For instance, the data may be related to operations of an electro-submersible pump (ESP). Electro Submersible Pumps (ESPs) may consume a large portion of the energy used in well production operations. As a result, the GHG emissions associated with ESP operations may depend on the cleanliness/sustainability of the power source for the ESP. If powered by renewable energy, the ESPs' emission footprint can be minimized. However, reliance on fossil fuels for electricity can result in significant GHG (e.g., carbon) emissions, underscoring the importance of integrating ESPs with sustainable energy sources to mitigate environmental impact. With this in mind, in some embodiments, the sustainability platform system 72 may operational optimization schedules or parameters for variable speed drives (VSDs) that control the operations of the ESP to reduce the energy consumption of an ESP and move towards net-zero emissions. Indeed, by utilizing VSD to dynamically adjust pump operations based on detected conditions (e.g., pressure, flow, sustainability parameters, the ESPs may operate at certain capacities that significantly reduce energy use. Moreover, incorporating VSDs permits precise control over pump speed and torque, optimizing efficiency across varying conditions. Further, the controlled VSDs may decrease electricity demand but also extend equipment lifespan and reduce the environmental impact of oil and gas extraction operations.

The collected data may also be related to hydraulic fracturing operations. That is, in oil and gas operations, hydraulic fracturing operations may involve deploying trucks and other equipment at a site to perform the fracturing operations. The fuel consumed in association with performing these fracturing operations may contribute to a large part of the GHG emissions associated with the total project. Indeed, the fuel consumed by vehicles and other equipment is used extensively across various stages from exploration through production to distribution. As such, the sustainability platform system 72 may monitor the fuel consumed for the hydraulic operations at various stages, at various hierarchical levels (e.g., groups of equipment, vehicles), and the like. Using the fuel consumption data, the sustainability platform system 72 may identify the largest consumers of fuel and use this information for various modifications that may be proposed in accordance with embodiments herein.

Additionally, the collected data may include drilling operations that involve a drilling activity workflow. The drilling activity workflow may include planning of rig activities for proposing a drilling plan accounting for the well profile, well activities, emission forecasts, and the like. As such, the enterprise production data may also include the real-time monitoring of emissions from rig activities, such as power consumption by controllers (e.g., PLCs) and fuel consumption based on data from flow meters. In some embodiments, GHG sensors may be positioned at various locations.

At block 180, the sustainability platform system 72 may identify a suitable reporting format to generate a sustainability report associated with the enterprise operations. The sustainability reporting format may be associated with a geographical location of the equipment, facilities, and operations of the enterprise. As such, the enterprise data may provide indications with regard to the regions or countries in which various aspects of the enterprise operations are undertaken. Based on these locations, the sustainability platform system 72 may query the sustainability database 94 or other suitable storage component to determine the reporting format used for the respective regions. That is, some regions or governmental agencies request reports regarding the sustainability parameters of the enterprise over the course of time. The reporting formats may include types of sustainability parameters to report, units in which the sustainability parameters are to be reported, a time period in which the sustainability parameters are to be reported, hierarchical levels in which to organize the sustainability parameters, an organizational structure to organize aggregated data, and the like. In addition, the sustainability platform system 72 may retrieve previously provided or produced reports 92 to determine the suitable reporting format. That is, the previously produced reports 92 may be scan and scraped to determine the sustainability parameters that are to be reported, along with other details with regard to the manner in which to report the sustainability parameters.

At block 182, the sustainability platform system 72 may aggregate or organize the data received at blocks 172, 174, 176, and 178 into appropriate data values in accordance with the reporting format determined at block 180. In some embodiments, the sustainability platform system 72 may also organize data with respect to different hierarchical levels of operations such as a facility level, a region level, a city level, a country level, and other geographically based levels. In addition, the sustainability platform system 72 may aggregate the data based on operations for facility operations and/or production operations. Further, the sustainability platform system 72 may aggregate or group the collected data into a variety of types of subsets of data, such that each subset of data may be packaged and sent to any of the engineering workflow systems 78 for analysis. Indeed, the engineering workflow systems 78 may request a particular type of data in a particular format or grouping, and the sustainability platform system 72 may subsequently package the relevant data accordingly and transmit it to the requesting engineering workflow system 78 for analysis. Moreover, the user input received via the manual source 112 may provide reporting format request in which the sustainability platform system 72 may organize the collected data. In some embodiments, the sustainability platform system 72 may organize the aggregated data according to an organizational structure that may distribute datasets in particular organizational levels or hierarchies to allow the enterprise to evaluate the respective aggregated datasets in various manners.

As such, the sustainability platform system 72 may aggregate or organize the collected data, such as the enterprise facility data and the enterprise production data, into various hierarchical levels to perform appropriate analysis within the respective hierarchies. The hierarchical levels may relate to physical levels, logical levels, or a hybrid of both depending on an associated organizational structure specified for the enterprise. That is, the collected data may be organized at a work unit level within a facility, a facility level to cover the operations within the facility, a city level to cover the operations performed by facilities in a city, and so on.

Based on the aggregated data, at block 184, the sustainability platform system 72 generated the sustainability report for the enterprise data based on the aggregated data and the suitable reporting format. In some embodiments, the sustainability report may be a dynamic, interactive report that may include visualizations that may be selected by user input and may cause the respective computing device to provide additional information related to the selection. In this way, the sustainability report may provide layers of information related to the sustainability parameters of the enterprise that correspond to different modular views of the enterprise.

At block 186, the sustainability platform system 72 may send the sustainability report (e.g., report 92) to a suitable computing device. That is, the sustainability platform system 72 may send the sustainability report to a user's device associated with a user that requested the sustainability report. Additionally, the sustainability platform system 72 may send the sustainability report to a computing device, website, or database associated with an agency or organization that provided information regarding the reporting format.

After receiving sustainability report, the respective computing device may cause an application to open or be executed regardless as to whether the computing device is in a sleep or low power mode. That is, the reception of the sustainability report may cause the computing device to perform some other action to cause a notification related to the sustainability report being received to be generated. The notification may include a visual notification, an audible notification, a haptic notification, or the like.

By enabling the sustainability platform system 72 to aggregate and group the collected data into various formats and structures, the sustainability platform system 72 may be able to use more modular processes to determine methods for improving different types of sustainability parameters at various hierarchical levels. Indeed, the aggregated data may be provided in parallel to different engineering workflow systems 78 in parallel, such that different systems may analyze the respective datasets to determine action plans 90 more efficiently. Further, the sustainability platform system 72 may compare distinct solutions and recommendations provided by different engineering workflow systems 78 with respect to the respective sustainability parameter being addressed.

It should also be noted that by starting with the broad scope of information in the method 170, the sustainability platform system 72 may enable a user or machine learning algorithm gain insight into broad or larger scale sustainability parameters differences to help determine where improvements may be found. That is, if a certain region of the enterprise operations produces more desirable sustainability parameters as compared to another, the sustainability platform system 72 may then provide drilled down information related to the equipment or facility data to identify the operational differences that account for the improved sustainability parameters.

Figure 5:
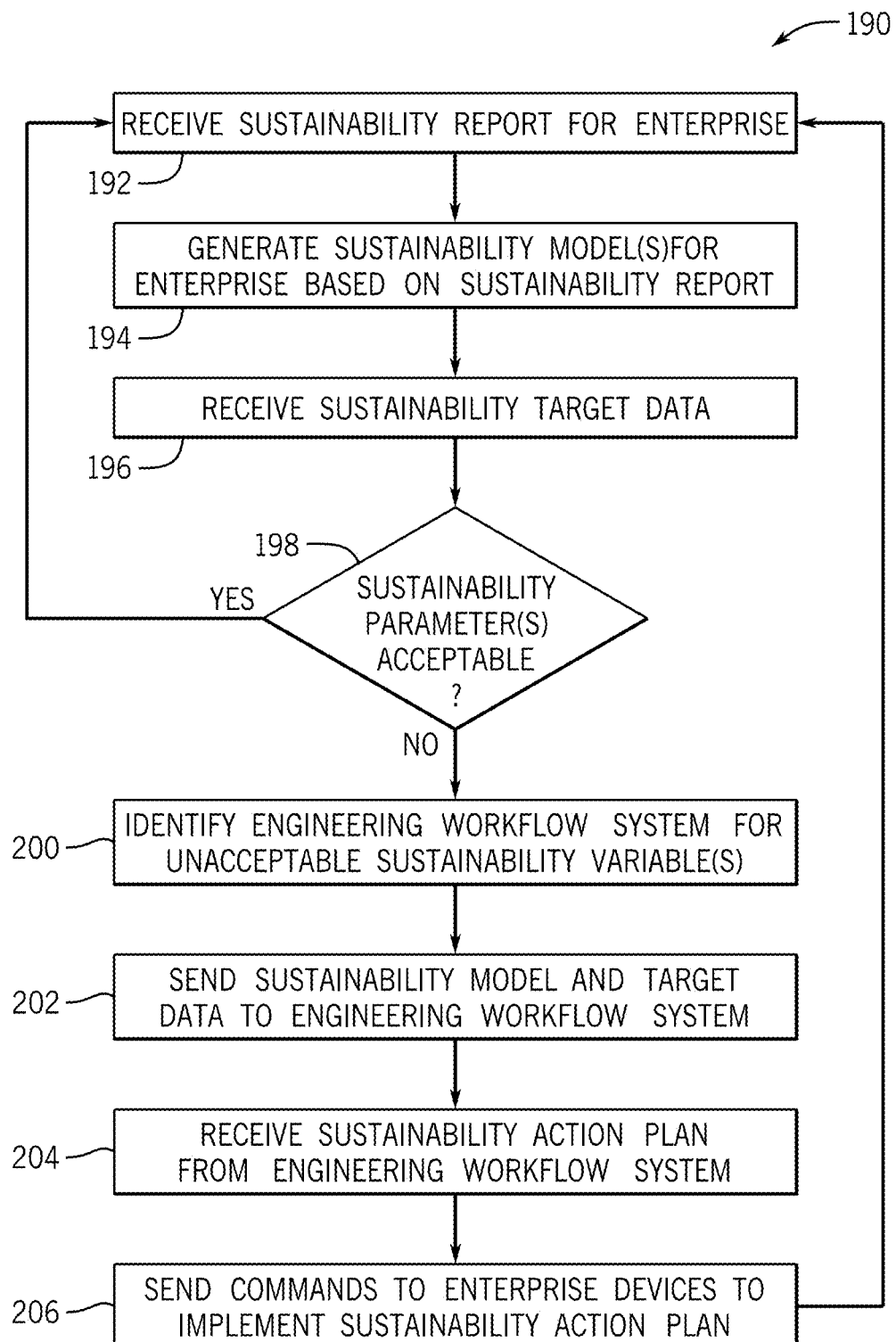
FIG. 5 is a flow chart of a method for generating sustainability action plans for enterprise operations employing the sustainability platform system of FIG. 3, according to one or more embodiments of this disclosure.

After generating the sustainability report, the sustainability platform system 72 may determine action plans 90 for improving one or more types of sustainability parameters. FIG. 5 illustrates a method 190 for generating a sustainability action plans for enterprise operations in accordance with embodiments presented herein. Although the following description of the method 190 is described as being performed by the sustainability platform system 72 and in a particular order, it should be understood that any suitable computing system with access to the appropriate data sources and engineering workflow systems may perform the method 190 in any suitable order.

Referring now to FIG. 5, at block 192, the sustainability platform system 72 may receive the sustainability report for the enterprise. The sustainability report may be generated as described above with respect to FIG. 4 or may be provided as a data file with the relevant information organized in ERP reports, spreadsheets, publications, or the like. It should be noted that the data included in the sustainability report may include economic data that may be provided by the strategy level planning systems 142 as described above. As such, the sustainability report may include economic information related to cost functions for various sustainability variables and other parameters related to implementing action plans 90, evaluating input data sources 74 or engineering workflow systems 78, or the like. As such, an economic analysis may be initiated before the action plans 90 are determined to consider forecasted business activities, technology costs, and other prioritized areas.

At block 194, the sustainability platform system 72 may generate one or more sustainability models for the enterprise based on the received sustainability report. In some embodiments, the sustainability model may be formulated by or contained within a machine learning model that detects patterns, trends, correlations, and other similarities between different datasets. As such, the sustainability model may provide sustainability parameter changes over time for different types of sustainability parameters with respect to different variables. For instance, an aspect of the sustainability model may include tracking operational parameters of facility operations and production operations with respect to GHG emissions. The sustainability platform system 72 may generate a sustainability model for the enterprise with respect to each different type of sustainability parameter or a combined sustainability model including multiple sustainability parameters. In some embodiments, the sustainability platform system 72 may generate a particular sustainability model based on a request from one or more of the engineering workflow systems 78, based on user input, or the like.

The sustainability model may be a data model that defines structures, relationships, and constraints of the sustainability parameters with respect to the facilities, hierarchies, operations, or other components of the enterprise. Moreover, the initial sustainability model may include one or more currently implemented action plans (e.g., methods of operation of the enterprise). By way of example, the data model may be a conceptual data model, a logical data model, a physical data model, or the like. As should be appreciated, an organizational unit of an enterprise (e.g., delineated by region, business line, corporate entity, organizational or operational boundaries, facility, etc.) may be characterized by a single sustainability model. However, multiple action plans may be implemented, at one or more levels within a single organizational unit. Moreover, the organizational unit may be reevaluated to include different portions of the enterprise with corresponding action plans for the components thereof maintained at the desired component level. As more data is collected over time, the data model may be updated to include time references and may be used to generate a machine learning model for the sustainability parameters. Although in some embodiments the sustainability platform system 72 may not generate the sustainability model to perform the method 190, the generated sustainability model may enable the sustainability platform system 72 to perform various analysis and processing operations in a more computationally efficient manner as compared to using the sustainability report.

At block 196, the sustainability platform system 72 may receive sustainability target data. The sustainability target data may include GHG emission limits, water usage limits, waste production limits, and other measurable sustainability parameter limits or ranges. In some embodiments, the sustainability target data may be determined by querying governmental regulations provided by the corporate data sources 110, accessible online, or the like. In addition, a user may define the sustainability target data via manual input. Further, the sustainability target data may include generic provisions to continually identify improvements in sustainability parameters. Moreover, the sustainability platform system 72 may determine sustainability target data based on achievements or goals detected in other enterprises similar to the respective enterprise.

In yet another embodiment, the sustainability platform system 72 may determine sustainability target data based on machine learning models that identify achievable sustainability target goals for enterprises that have similar equipment, enterprise operations, facility operations, or the like. That is, the machine learning models may receive similar datasets as described above associated with a collection of enterprises and compare the sustainability parameters for each of the enterprises relative to the respective enterprise associated with the sustainability platform system 72. Based on the models, the sustainability platform system 72 may identify sustainability parameters achieved by other enterprises yet unachieved by the respective enterprise. These identified sustainability parameters may be employed by the sustainability platform system 72 as the sustainability target data. In addition, the sustainability platform system 72 may determine that the average sustainability parameter for the related enterprises may be suitable as the target sustainability data.

In some embodiments, the target sustainability data may be an aggregated sustainability parameter associated with the enterprise operations, the facility operations, or both. As such, the enterprise, as a whole, may be evaluated with respect to the target sustainability data.

At block 198, the sustainability platform system 72 may determine whether the sustainability parameters for the enterprise as indicated in the sustainability report or generated sustainability model are acceptable in view of the sustainability target data. If the sustainability parameters are acceptable, the sustainability platform system 72 may return to block 192 and continue monitoring for updated sustainability reports.

If, however, the sustainability parameters are not acceptable, the sustainability platform system 72 may proceed to block 200 and identify an engineering workflow system 78 to address the unacceptable sustainability parameters. That is, as mentioned above, each of the engineering workflow systems 78 may provide action plans or recommendations to address particular sustainability parameters, particular aspects or operations of the enterprise, or the like. As such, the sustainability platform system 72 may determine whether one of the engineering workflow systems 78 is suited to address the unacceptable sustainability parameters. In some embodiments, each of the engineering workflow systems 78 may identify sustainability parameters that are associated with its respective analysis. The sustainability platform system 72 may then identify the one or more engineering workflow systems 78 that may be suitable to improve respective sustainability parameters. In some embodiments, the sustainability platform system 72 may broadcast the request for improved sustainability parameters to each of the engineering workflow systems 78, which may then determine whether the respective analysis performed by the respective system may provide any support to achieve the sustainability target data. It should be noted that the broadcast may also be provided to the strategy level planning systems 142 to assess economic analysis context for action plans 90, solutions provided by the engineering workflow systems 78, or other related tasks that may be implemented for improving sustainability parameters.

In some embodiments, the engineering workflow system 78 may be related to a number of abatement technologies associated with reducing GHG emissions, water usage, waste accumulation, and the like. By way of example, the engineering workflow system 78 may include access to a database or catalog of abatement technologies, which may be scraped from a network (e.g., Internet), internal databases, or the like. For instance, technologies related to energy industries may be found in various web-provided catalogues. The abatement technologies may be focused on performing certain operations, such as avoiding routing flaring, performing flare maintenance, avoiding use of light oils to dilute extra heavy oils to transport them to deep conversion refineries, replacing leaky equipment, employing best operating practices, conducting routine leak detection and repair (LDAR), employing renewable energy to generate heat, steam, and electricity, capturing and sequestering carbon when producing and refining high carbon assets, using green hydrogen in hydro-conversion refinery, employing high-efficiency pumps than run on renewable energy, monitoring and repairing for corrosion in legacy assets, and the like. It should be noted that the engineering workflow systems 78 may account for technology parameters for each of these abatement technologies may be associated with its own set of abatement technologies parameters, such as emissions reduction maximal capacity, construction/decommissioning time, lifetime cost Capex/Opex, geographical applicability, and the like.

With the foregoing in mind, each engineering workflow system 78 may be associated with one or more abatement technologies. In addition, each abatement technology may be associated with one or more sustainability parameters. That is, the sustainability platform system 72 may identify engineering workflow systems 78 to query or access based on the association between the desired sustainability parameters and the respective abatement technologies. That is, if the sustainability parameters are not acceptable at block 198, the sustainability platform system 72 may query a lookup table or database for abatement technologies associated with the respective sustainability parameters. After identifying the relevant abatement technologies, the sustainability platform system 72 may query the engineering workflow systems 78 to identify the suitable engineering workflow systems 78 that may be associated with the relevant abatement technologies. In some embodiments, a large language model or artificial intelligence system may develop the associations between the abatement technologies and the engineering workflow systems 78 based on descriptions of the engineering workflow systems 78, as published on a network location or the like.

Referring back to FIG. 5, after identifying suitable engineering workflow systems 78, the sustainability platform system 72 may, at block 202, send the sustainability model and the sustainability target data to the identified engineering workflow system(s) 78. In some embodiments, the sustainability platform system 72 may send portions of the sustainability model, as opposed to the entire sustainability model, to accommodate the analysis operations performed by the respective engineering workflow system 78. In this way, the sustainability platform system 72 may reduce the amount of data that is transmitted across a network to improve network latency. Further, the engineering workflow system 78 that receives the modified sustainability model may efficiently process the received data without analyzing or reviewing data that may be irrelevant to its operations. Further, it should be noted that the sustainability platform system 72 may send multiple sustainability models or portions thereof to multiple engineering workflow systems 78 in parallel. As such, the various engineering workflow system 78 may perform their respective analysis operations in parallel, thereby improving the efficiency in which the sustainability platform system 72 may receive recommendations.

After receiving the sustainability model (or equivalent datasets), the respective engineering workflow system 78 may compare the data present in the sustainability model to other datasets that it tracked, stored, or modeled. The respective engineering workflow system 78 may then identify solutions or action plans that other enterprises have implemented or determine unique solutions for the enterprise based on its core functions. For example, the engineering workflow system 78 may receive information related to the operational schedule of the facility operations and/or production operations, model modifications to these operations over time, and determine suitable operational modifications that may assist the enterprise in achieving respective sustainability target data.

By way of example, the action plans provided by the engineering workflow systems 78 may provide operational recommendations to reduce GHG emissions for the facility operations, the production operations, or both. That is, the action plan may include recommendations with regard to operating field devices in the production operations differently to reduce carbon emissions. Further, a recommendation may include providing a carbon capture device at a facility to reduce carbon emissions and provide a location or entity to receive the captured carbon for reinjection operations. In addition, the recommendations may include reducing the amount of emissions flared when it is determined that some emissions can be directed to the capture technology to achieve the sustainability goals.

In some embodiments, the action plans may include recommendations that may provide an initial improvement in sustainability parameters, such as recommendations to change lights in facilities to light emitting diode technology, which consumes less energy compared to other light sources. However, after making this change, the effect on sustainability parameters to achieve net zero goals are limited because the gain is achieved immediately. As such, the action plans may project different operations and technologies to use over time to continue to enable the enterprise to achieve improved sustainability parameters.

In addition, the action plans 90 may include modifying the operational schedule of devices (e.g., lights, HVAC) within the building 56. That is, half of the available lights may be powered during day hours to provide limited, less energy intensive, amounts of light. Further, the operating conditions of the building 56 may be dynamically altered to rely on occupancy data. That is, the operational schedule for the building 56 may have set hours for devices to operate, but the operational schedule may be modified based on the occupancy data (e.g., heat sensors, light sensors) indicating that persons are not present at the building 56, a portion of the building 56, and the like. In other words, the action plan 90 may include modifying the operational schedule of utilities of the building 56 from a static (e.g., user defined) format to a dynamic (e.g., occupancy sensor based) scheme.

At block 204, the sustainability platform system 72 may receive the recommendations or generated action plans from the respective engineering workflow systems 78. In some embodiments, the recommendations or action plans may include operational changes (e.g., equipment operation schedule change to operate at certain times when renewable sources of energy are available) for devices in the facility operations, the production operations, or both. In addition, the recommendations or action plans may include equipment changes that may involve replacing equipment with more efficient equipment, adding equipment that may not be previously present (e.g., carbon capture), identifying business partners to purchase carbon credits or exchange services, and the like.

At block 206, the sustainability platform system 72 may send commands to devices within the enterprise to implement the action plan 90. As such, IoT devices 44 may adjust respective operations of other devices to implement the recommended actions provided in the action plan 90. In some embodiments, the action plans provided by the various engineering workflow systems 78 may be evaluated by the sustainability platform system 72 to determine whether each of them can be implemented with one another. Further, the action plans may be evaluated with respect to budgetary constraints and other constraints. The sustainability platform system 72 may select a combination of the provided action plans to use to generate commands based on the combination that suits the interests and constraints of the enterprise. These decisions may be made based on an optimization algorithm perform by the sustainability platform system 72, user input received by the sustainability platform system 72, or the like.

In some embodiments, the action plans 90 may be stored in the sustainability database 94 for analysis or retrieval at another time. In this way, the sustainability platform system 72 may evaluate action plans 90 prior to sending the sustainability model to engineering workflow systems 78 to identify recommendations more efficiently if the respective action plans 90 are applicable.

Figure 6:
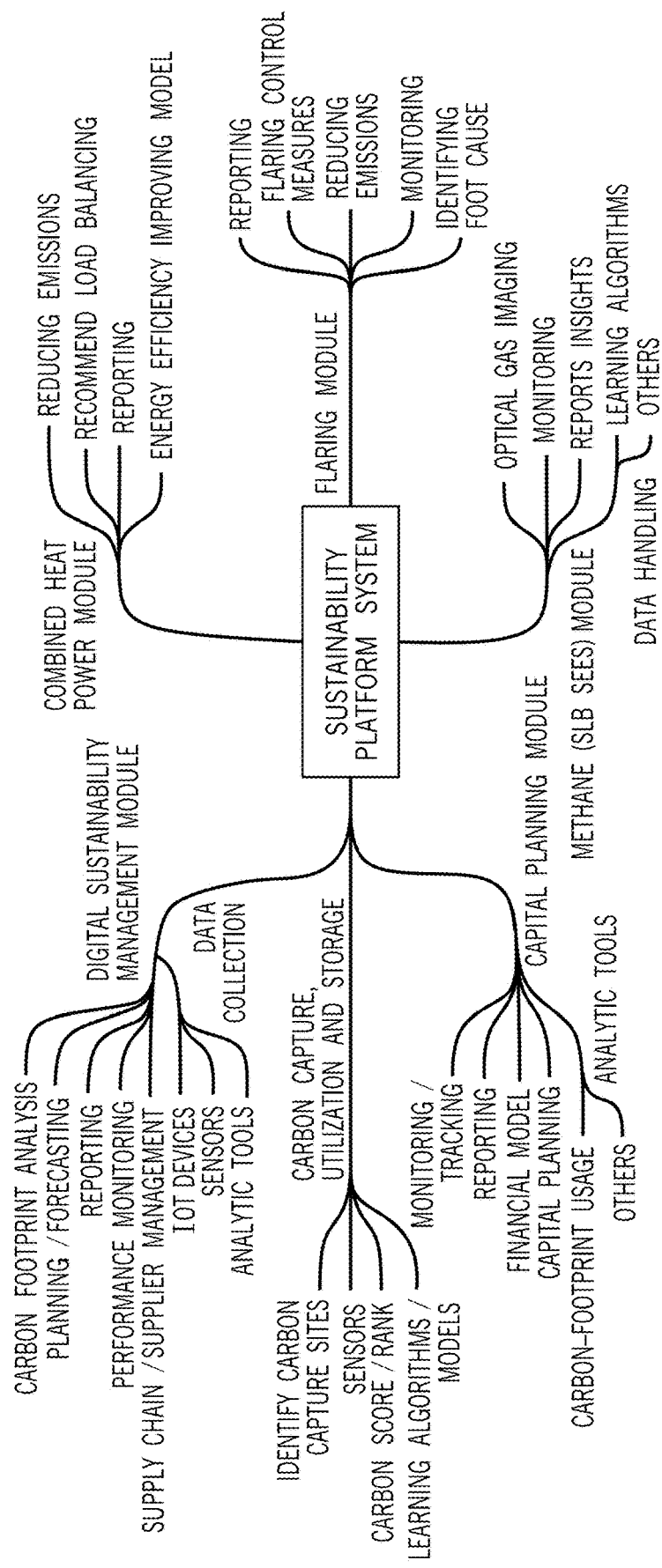
FIG. 6 illustrates a data diagram of various types of data that may be analyzed for determining plans and workflows to improve sustainability parameters for the enterprise operations, according to one or more embodiments of this disclosure.

To help further illustrate, FIG. 6 is an example flow diagram of a sustainability platform system 72 receiving information, such as via one or more input data sources 74 or modules to determine output controls and/or instructions of one or more action plans 90 to optimize for different sustainability variables. In some embodiments, the input data sources 74 may be grouped by data type or source. For example, a sustainability management module may provide information regarding baseline sustainability parameters (e.g., carbon footprint, waste levels, water usage), a carbon capture module may provide information regarding current mitigation of sustainability parameters, and a capital planning module may provide input on the financial constraints and viability of certain actions and/or compliance parameters. Additionally, the sustainability platform system 72 may identify suitable engineering workflow systems 78 based on the expected outputs provided by those respective systems to generate the action plan(s) 90. For example, the sustainability platform system 72 may utilize different engineering workflow systems 78 to provide instructions or control signals for heat and power operations (e.g., via a combined heat power module), for flaring control (e.g., via a flaring module), for methane control (e.g., via a methane module), and/or for other operations of the enterprise. Although FIG. 6 focuses on carbon-oriented workflows and variables, it should be understood that in other embodiments the sustainability platform system 72 may coordinate activities with modules that focus on water, waste, energy, and other suitable sustainability parameters.

Furthermore, the sustainability platform system 72 may receive sustainability parameter data such as water data and emission data in different scopes or hierarchical levels. For example, scope 1, scope 2, and scope 3 emission data (e.g., as defined by the EPA) may be obtained and considered when evaluating the enterprise sustainability model. In some embodiments, the sustainability platform system 72 may coordinate with the engineering workflow systems 78 such as a methane management system, a flaring management system, a combined heat and power optimization system, a carbon capture system (CCS), and an agriculture system. Based on the result provided by the engineering workflow systems 78, the sustainability platform system 72 may evaluate the provided action plans 90 with different planning modules or systems to perform different respective analysis operations, such as via the planning block 86 (e.g., planning module). For instance, the sustainability platform system 72 may determine decarbonization pathways, decarbonization financial planning, and product carbon footprints based on the received action plans, measurement data, or both. The decarbonization pathways may indicate one or more operational or business changes (e.g., work from home policies) to improve carbon emissions across the enterprise. The decarbonization financial planning (e.g., via the strategy level planning systems 142) may account for the costs associated with implementing the various action plans. The product carbon footprint may provide an indication of the expected carbon footprint associated with producing the product. As mentioned above, the product carbon footprint may capture a total amount of carbon emissions associated with the production of various products to the end of the lifecycle of the product. In this way, the decarbonization pathways that may be part of the action plans 90 may provide multiple scenarios of carbon emission reduction plans to meet emission goals for the enterprise while continuing to support business activities. Although FIG. 6 provides example modules or systems in which the planning block 86 may use to generate different outputs, it should be understood that the modules presented herein are merely examples and the present embodiments should not be limited to these examples.

Figure 7:
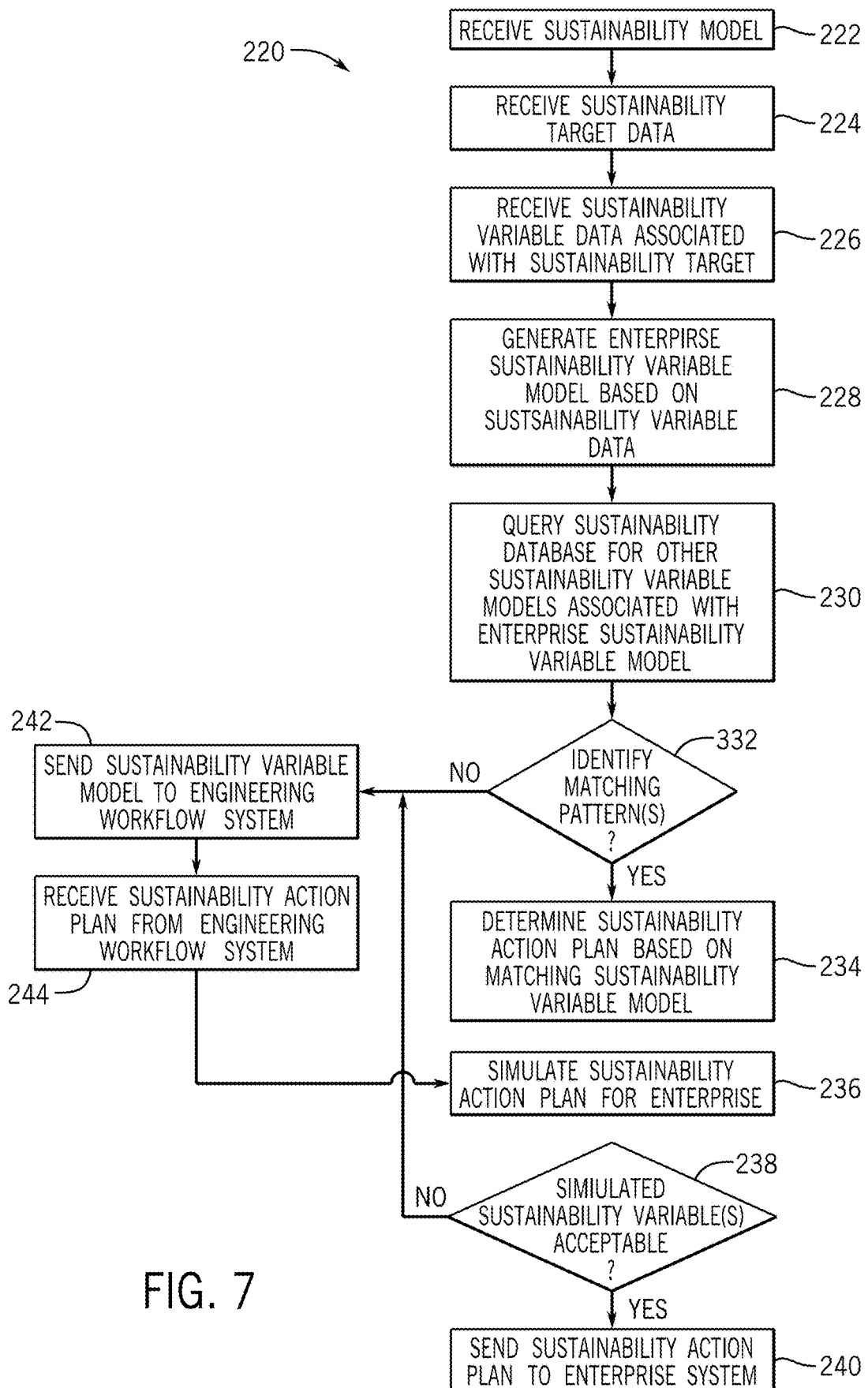
FIG. 7 illustrates a method which the sustainability platform system may simulate sustainability action plans over a period of time for analysis, in accordance with embodiments herein.

Keeping the foregoing in mind, FIG. 7 illustrates a method 220 which the sustainability platform system 72 may simulate sustainability action plans 90 over a period of time for analysis, in accordance with embodiments herein.

Although the following description of the method 220 is described as being performed by the sustainability platform system 72 and in a particular order, it should be understood that any suitable computing system with access to the appropriate data sources and engineering workflow systems may perform the method 220 in any suitable order. As such, it should be noted that the embodiments described below may be performed via the planning block 86 or via a respective engineering workflow system 78.

Referring now to FIG. 7, at blocks 222 and 224, the sustainability platform system 72 may receive the sustainability model and the sustainability target data as described above with reference to FIG. 5. At block 226, the sustainability platform system 72 may receive sustainability variable data associated with the sustainability target data. That is, the sustainability variable data may refer to one or more sustainability parameters that make up part of the sustainability target data or a variable in which the sustainability platform system 72 is requested to optimize. For instance, the sustainability target data may include energy, emissions, water, and waste objectives. However, a user may select to optimize for the emissions portion of the sustainability target data. The emissions may be the sustainability variable data received at block 226.

In some embodiments, the sustainability platform system 72 may receive multiple sustainability variable datasets for optimization and may identify multiple engineering workflow systems 78 to coordinate with to determine action plans 90. By evaluating each sustainability variable data in isolation, the sustainability platform system 72 may identify solutions in parallel and present action plans 90 that optimize for different sustainability variables to provide a user more context to select the generated action plans 90.

At block 228, the sustainability platform system 72 may generate an enterprise sustainability variable model based on the sustainability variable data and the sustainability model received at block 222. That is, the sustainability platform system 72 may isolate a portion of the sustainability model that captures correlations and patterns related to the sustainability variable. In this way, the enterprise sustainability variable model may include a subset of data to allow the respective analysis component to efficiently process the respective subset of data, as opposed to filtering through datasets that may not be relevant for its analysis.

At block 230, the sustainability platform system 72 may query the sustainability database 94 to determine whether other sustainability variable models stored in the sustainability database 94 have matching patterns. That is, the sustainability platform system 72 may compare the sustainability variable datasets across multiple sustainability variable models and identify any matching sustainability variable datasets. The matching datasets may correspond to a period of time or correspond to an improvement in the sustainability variable datasets, such as from previously determined sustainability models and action plans 90. The sustainability platform system 72 may identify similarities in the emission sources, the scale of emission reductions desired, the location and environment of the enterprise or portion thereof between the present sustainability variable data and that of other sustainability variable models. As such, if the sustainability platform system 72 identifies matching datasets, the matching sustainability variable model may provide insights into action plans 90 that may be implemented by the respective enterprise to improve the sustainability variable parameters. Such insights may further increase the efficiency of the sustainability platform system 72, reducing computational complexity and/or reducing computation time. Additionally, in some embodiments, the sustainability database 94 may be structured (e.g., tabulated, tagged, or otherwise delineated) according to potential similarities for more efficient queries. For example, the sustainability models (e.g., sustainability variable models) of the sustainability database 94 may include metadata associated with emission sources, emission scale, organizational scale, geographical location, and/or environment.

Returning to block 230, querying a database of existing sustainability models may be performed based on one or more parameters within the sustainability database 94. For example, querying may be based on similarities in emission sources to address one or more specific issues with of the current sustainability model. Moreover, in some embodiments, queries may include minimum success criterion that were achieved by the matching sustainability model (e.g., matching sustainability variable model). For example, emission reduction for a particular sustainability model must have met or exceeded an emission reduction target in order for the sustainability model to be matched with the current sustainability model.

Additionally or alternatively, the query may also examine the scale of the emission reduction in addition to matching emission sources. For example, sustainability models at different granularities within an enterprise (e.g., operations within a region versus operations at a particular facility) may be selected and optimized according to the emission sources they address and the scale of the emission reduction they provide. Indeed, an action plan 90 for a set of multiple facilities in a region producing a relatively large amount of emissions may have a higher correlation to another set of multiple facilities having the same order of magnitude of emissions than a single facility or set of multiple facilities having a relatively small amount of emissions (e.g., by one or more orders of magnitude). However, if no match at the same organizational unit size is found, in some embodiments, the query may return one or more action plans for smaller organizational unit sustainability models that match other query parameters. Such action plans may be aggregated to form an action plan for the generated sustainability variable model.

Additionally or alternatively, regional location and environmental (e.g., offshore versus onshore) parameters can also be incorporated into the query. For example, sustainability models within the sustainability database 94 may be correlated to a location where technology availability, costs, and regulations have impacted the simulation (e.g., optimization) of an action plan 90 and sustainability model. Correlating such parameters during querying may enable the suitability of sustainability models within the sustainability database 94 to be based on real world constraints, in addition to the anticipated emissions impact of the actions within the sustainability model.

With this in mind, at block 232, the sustainability platform system 72 may determine whether matching patterns or datasets have been identified. The matching datasets may correspond to certain measurement values within some threshold (e.g., +/−5%, +/−10%, +/−20%, +/−50%), desired trends in the sustainability variable data (e.g., decrease in GHG emissions over time), or any other characteristic that may provide insight into improving a respective sustainability variable parameter.

If the sustainability platform system 72 identifies a matching pattern or desired effect, the sustainability platform system 72 may proceed to block 234 and determine a suitable sustainability action plan 90 based on the matching sustainability variable model. The matching sustainability variable model may be associated with an enterprise of the same industry type, a different industry type, a same regional location, a different location, or the like.

That is, the sustainability platform system 72 may retrieve the matching sustainability variable model and determine the action plans 90 implemented by the respective enterprise to achieve the results illustrated in the matching variable model. In some embodiments, the matching sustainability variable model may include a list of operational commands, operational schedules, types of equipment used, and other information that may be associated with the sustainability variable parameter. It should be noted that the matching sustainability variable model may also include multiple models that corresponds to different portions of the hydrocarbon production system 10 or any suitable enterprise. As such, by way of example, one matching sustainability variable model may be related to enterprise operations, while another matching sustainability variable model may be related to facility operations. In addition, some matching sustainability variable models may represent both enterprise and facility operations. In this way, the sustainability platform system 72 may determine adjustments to enterprise operations, facility operations, or both to achieve the target sustainability data.

Based on the sustainability action plans associated with the matching sustainability variable model, the sustainability platform system 72 may, at block 236, simulate implementing the sustainability action plan over a period of time (e.g., months, years, decades) for the enterprise. That is, the sustainability platform system 72 may apply machine learning algorithms to predict the effects of implementing the sustainability action plans 90 over a course of time for the enterprise. The simulation may perform an optimization of the sustainability variable data in the context of the input data (e.g., from the input data sources 74) to generate a simulated sustainability variable model or full sustainability model for the enterprise. For example, cost data accurate for the location and scale of deployment in the original sustainability variable model (as opposed to that of the matched sustainability variable model) may be utilized in the simulation to determine emission reduction estimates for the newly simulated sustainability model. Indeed, the simulations may include capital expenditure data related to the costs for implementing the action plan 90 over time, the sustainability variable parameter effects over time, and the like. In this way, users may realize the benefits of implementing the action plan 90 over the life of the facility operations, the production operations, or both.

At block 238, the sustainability platform system 72 may determine whether the simulated sustainability variable data achieves the sustainability target goals indicated in the sustainability target data. If the sustainability target goals are achieved, the sustainability platform system 72 may proceed to block 240 and send the sustainability action plan 90 to the computing device associated with the enterprise for implementation or evaluation in accordance with embodiments described above. However, if the simulated sustainability variables do not achieve the sustainability target goals, or if there were no matching sustainability variable models, the sustainability platform system 72 may proceed to block 242. As should be appreciated, and as discussed further below with regard to 242, the sustainability platform system 72 may verify that the respective action plan 90 indeed causes the enterprise to achieve sustainability goals defined by the sustainability target data. For example, a specific action plan 90 may provide acceptable sustainability parameters at a particular facility, but still fail to be acceptable for the enterprise as a whole, when extrapolated and aggregated with the rest of the enterprise data. As such determining whether the simulated sustainability variables are acceptable may also include evaluating the simulated action plan 90 along with enterprise data representative of the enterprise as a whole to determine whether the corresponding sustainability parameters are acceptable or achieve the goals set by the sustainability target data.

At block 242 and block 244, the sustainability platform system 72 may send the sustainability variable model or the simulated sustainability variable model to an appropriate engineering workflow system 78 or to multiple engineering workflow system 78 and receive a sustainability action plan 90 from the engineering workflow system(s) 78. That is, one or more of the engineering workflow systems 78 may affect the same sustainability variable parameter. As such, the engineering workflow systems 78 may analyze the received sustainability variable model and perform similar operations described in blocks 202 and 204 of the method 190 to determine operational changes or equipment changes to improve the respective sustainability variable data.

The engineering workflow system(s) 78 may provide a finer grain analysis of potential changes (e.g., optimization) to the sustainability variable parameter than the query that matches patterns at the organizational unit level. For example, an engineering workflow system 78 may utilize a facility level planner to optimize physical placement of, sizing of, number of, and/or operational characteristics of wells 22, separators 42, storage tanks 43, pipelines 38, flares, engines, motors, energy sources (e.g., solar panels, wind turbines, etc.) and/or other components of a facility. Moreover, an engineering workflow system 78 may utilize a facility level planner to optimize individual components of a single facility or multiple facilities (e.g., in parallel) of the sustainability variable model. Once the sustainability platform system 72 may receive the generated action plans 90 from the engineering workflow systems 78 and proceed to block 236 to simulate the effects of implementing the sustainability action plans 90 over the course of time to optimize for the enterprise and continue the method 220.

If the simulated action plan 90 of block 236 is determined to have acceptable sustainability variables (e.g., at block 268), the action plan 90 may be sent to the enterprise system, as in block 240. As should be appreciated, when implemented, the new action plan 90 changes the sustainability model to an updated sustainability model. In some embodiments, the old sustainability model may be noted in the sustainability database 94 as being superseded, such as to reduce weightings therefore or insight therefrom for potential matching when querying for future matches, such as in block 230. For example, future querying may ignore sustainability models designated as superseded. Moreover, the updated sustainability model may be added to the sustainability database 94 for such future queries.

Keeping the foregoing in mind and referring back to the data flow diagram 70 of FIG. 2, the sustainability platform system 72 implement an automated optimization loop to continuously identify action plans 90 that enable the enterprise to continuously work to achieve improved sustainability parameters over time. Indeed, in some embodiments, the sustainability platform system 72 may continuously monitor the input data sources 74 to determine whether the enterprise is achieving the sustainability target data. After receiving the input data, the sustainability platform system 72 may generate the sustainability model as described above and receive updated input data. If the input data has changed more than some threshold amount (e.g., 10%), the sustainability platform system 72 may regenerate the sustainability model using the updated data and identify other sustainability action plans 90 that may be better suited to enable the enterprise to achieve the sustainability parameters. It should be noted that although a number of embodiments described herein refer to determining whether a threshold is exceeded, it should be understood that the embodiments may also be performed in response to detected values falling below a threshold, falling outside of a threshold range, or any other suitable threshold comparison operations.

Figure 8:
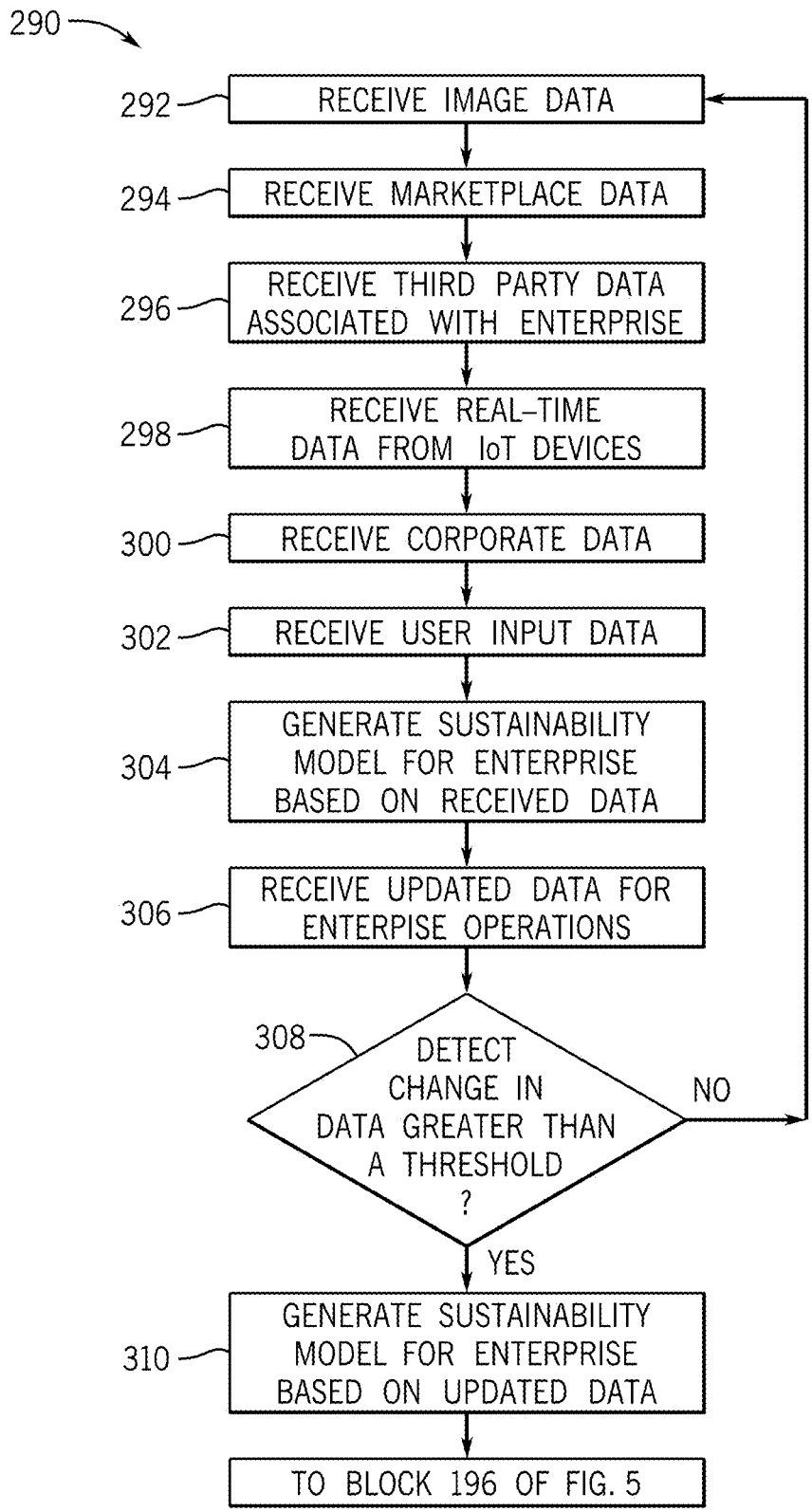
FIG. 8 illustrates a flow chart of a method for updating sustainability action plans based on input data changes, according to one or more embodiments of this disclosure.

FIG. 8 illustrates a flow chart of a method 290 for updating sustainability action plans 90 for re-optimization based on changes detected in the input data provided by the data sources 74. Although the following description of the method 290 is described as being performed by the sustainability platform system 72 and in a particular order, it should be understood that any suitable computing system with access to the appropriate data sources may perform the method 290 in any suitable order.

Referring now to FIG. 8, at blocks 292, 294, 296, 298, 300, and 302, the sustainability platform system 72 may receive data from the input data sources 74 described above with reference to FIG. 2. Each of these received datasets may trigger or cause the sustainability platform system 72 to determine an updated sustainability model, updated action plans 90, and the like to re-optimize the enterprise to achieve its sustainability goals.

Keeping this in mind, at block 292, the sustainability platform system 72 may receive image data via the image acquisition source 102 or other suitable sources that may be part of the production operations, the facility operations, or both. By way of example, the image data may include image captures of methane emissions during routine flaring, venting, and the like. In addition, image sensors (e.g., leak detection sensors, infrared sensors, temperature sensors, pressure sensors) may detect fugitive emissions that may be emitted from equipment, the office building 56, or other suitable structure or device. These detected emissions could trigger a re-optimization of the implemented action plans 90 as described herein in response to a detectable change or threshold change in detected emission levels (e.g., methane) above a set threshold (e.g., if detected levels exceed 110% of levels for a comparable time period, assuming all other factors are constant, such as production volume). In another embodiment, an increase in the detected emission levels over a limited period of time (e.g., minutes, hours, days, weeks) may potentially cause the sustainability platform system 72 to identify abatement actions to deploy within a certain time frame, at greater volume or amount than what is currently being deployed, or the like. In the same manner, a reduction in detected emissions in excess of the forecast reduction could trigger a re-optimization process to account for the updated emission reduction trajectory.

In some embodiments, the frequency of the image capture may influence the re-optimization trigger. For example, images captured at a high frequency (e.g. hourly) that show an increase in emissions may prompt a re-optimization of the plan 90 (e.g., generating updated action plans 90 based on updated sustainability model). In some embodiments, detected changes greater than some threshold within a certain amount of time may be prioritized. As such, the sustainability platform system 72 may determine immediate abatement actions to address the emissions as soon as possible and send corresponding notifications and commands to user devices, equipment, and the like as described above. Conversely, images captured over a lower frequency (e.g. monthly) may provide longer range patterns of emissions that may be utilized for optimization of a longer-term plan (that also accounted for other factors, such as expected changes in production, that may be harder to predict over a shorter time period).

In some embodiments, the image data may be captured for point sources, such as particular facilities or pipelines, or be aggregated over a larger geographic area. If aggregating data over an area, the granularity of change in emission levels may be determined and compared to a respective aggregated threshold in order to determine whether the sustainability platform system 72 may trigger re-optimization. For example, the collected data may be averaged over the entire area (e.g., producing a single emissions value per time slice), mapped to "hot spots" (e.g., limited geographical areas experiencing elevated detected emissions) that may produce multiple emissions values that potentially contour over the area, divided into predefined sub-areas such as a grid (e.g., producing emissions values for each sub-area), and the like.

At block 294, the sustainability platform system 72 may receive marketplace data via the marketplace source 104. The marketplace data may include a variety of types of datasets. By way of example, cost data or data related to implementing certain technologies, performing certain action plans, prices for carbon credits, and the like may be acquired from third party technology providers. As such, if the updated cost data exceeds a cost threshold previously identified by the sustainability platform system 72, the sustainability platform system 72 may trigger re-optimization of the action plans 90 to identify more suitable action plans 90 that are cost sensitive (e.g., optimized for lowest cost). For example, if cost data for an action plan 90 that has already been implemented changes according to the marketplace data, the sustainability platform system 72 may trigger re-optimization of the action plans 90 to account for the updated cost data (e.g., cost data could in capital, operating or fixed/maintenance costs). In some embodiments, the sustainability platform system 72 may optimize or prioritize the re-optimization of the action plans 90 for lowest cost, as the updated cost data may result in the currently implemented action plan 90 now being the suboptimal solution. With this in mind, the sustainability platform system 72 may re-optimize the action plans 90 prioritizing for maximum emissions reduction, as the new cost data may simply change the overall cost of the action plan 90, not the mix of actions selected.

Keeping this in mind, the sustainability platform system 72 may also monitor the changes in marketplace cost data to track specific parts or portions of the action plans 90 that may have exceeded respective cost thresholds, such that the sustainability platform system 72 may focus re-optimization for the respective portions. Indeed, the sustainability platform system 72 may identify operational changes or updates those portions of the action plans 90 to limit the processing or re-optimization of the entire action plan 90. In some embodiments, if the cost data for any portion or all of the action plans 90 being implemented changes at any point, the sustainability platform system 72 may trigger a re-optimization to determine if the cost changes results in the currently implemented action plans 90 still being the optimal lowest cost solution.

It should be noted that the same re-optimization process may be triggered for data that specifies the emission reduction potential of various portions of the action plans 90. That is, the marketplace data may include data updates regarding improved operational techniques, updated emissions information for operational schedules and devices, and the like. These changes to input data may cause the sustainability platform system 72 to trigger the re-optimization of the action plans that have been previously optimized for maximum emission reduction.

At block 296, the sustainability platform system 72 may receive third party data associated with the enterprise operations via the third-party data source 106. By way of example, the sustainability platform system 72 may monitor the engineering workflow systems 78 or other third-party sources 106 to determine whether updated or new actions (e.g., equipment, software updates, operational schemes) have become commercially available and whether these updates are applicable to the user, the enterprise, and the like based on the knowledge of the respective industry, workflows, and domain of the enterprise. For example, if data indicative of a supplier providing a new solution to the market that would address the user's emissions goals, the sustainability platform system 72 may trigger a re-optimization incorporating the new solution. Similarly, if an existing action becomes available in their geographic location, the sustainability platform system 72 may also trigger a re-optimization process.

At block 298, the sustainability platform system 72 may receive real-time data from IoT devices 44 or other devices via the real-time data source 108. The real-time or IoT data may include consumption and operational data collected and/or aggregated from individual facilities. These changes can cause the sustainability platform system 72 to trigger re-optimization of the action plans 90 if the detected changes correspond to emissions increasing or decreasing. In some embodiments, the sustainability platform system 72 may infer changes in emissions data based on changes one associated data, such as fuel consumption, by direct measurement of emissions using point sensors and LiDAR, and the like. In addition, if using associated data, the sustainability platform system 72 may determine an appropriate calculation of emissions using known emissions factors for the data source. For example, emissions could be calculated from the quantity of diesel fuel consumed over a specific time period, from the run time of pumps used in artificial lift operations, from pressure readings over a pipeline network, and the like. After emissions have been calculated, if the value exceeds a set threshold, the sustainability platform system 72 may trigger the re-optimization process.

At block 300, the sustainability platform system 72 may receive corporate data via the corporate data source 110. The corporate data source 110 may provide corporate data that may be managed within other corporate business systems and may trigger or cause the sustainability platform system 72 to perform the re-optimization process for cost-optimized action plans 90 and the like. Indeed, the corporate data may include changes in spend data from fuel purchases, electricity consumption for production and facility operations, and the like. In addition, corporate data may include information detailing changes in procurement and supplier schedules that may cause the sustainability platform system 72 to trigger a re-optimization process if the emissions related to the changes exceed a set threshold. In some embodiments, the sustainability platform system 72 may perform a verification of the expected emissions impact (e.g., generate updated sustainability model) prior to triggering re-optimization processes. For instance, when considering scope 3 emission sources where emissions factors are not well defined or understood, the sustainability platform system 72 may generate the updated sustainability model, as opposed to determining action plans 90 based just on the change in detected levels (e.g., corporate data, image data, marketplace data, IoT data).

In some embodiments, changes to a corporate structure due to re-organization of the enterprise, consolidation of the enterprise, acquisitions made by the enterprise may also trigger a re-optimization process. Indeed, the sustainability platform system 72 may prioritize this re-optimization process when the change in structure may impact the emissions targets and budget limits which the original action plan was optimized to address. In addition, the sustainability platform system 72

In some embodiments, the sustainability platform system 72 may evaluate the corporate data with respect to a particular time frame over which to detect changes to avoid anticipated changes in spending from triggering a re-optimization (e.g., when remaining budgets are being spent at the end of the year). Additionally, establishing a baseline of anticipated spending over set time periods (monthly, yearly, etc.) may help to identify when changes in spending should trigger a re-optimization.

In some embodiments, the corporate data may be acquired by scraping operations performed on electronic news sources, social media platforms, websites, and the like. In addition, databases that include the corporate data may be periodically queried to identify updated corporate data. In some cases, a news article, posting, or social media comment or trend may cause the sustainability platform system 72 to query the data sources for updated corporate data.

At block 302, the sustainability platform system 72 may receive user input data via the manual data source 112. The user input data may include an indication that an action plan 90 or part of the action plan 90 has been implemented (e.g., when the action plan is being executed). In addition, user input data may include estimated emissions data when emissions cannot be measured directly or estimated from proxy data. This user input data may also attribute the impact of a particular action to the estimated emissions or detected emissions. That is, the user input data may provide context or correlation data to indicate the relationship between effects or change in the input data detected by the sustainability platform system 72 and the portions of the action plans 90. As with other data examples, if the inputted user data exceeds a respective set threshold, the sustainability platform system 72 may trigger a re-optimization process.

The user input data may also include spend data or corporate data for action plans 90 or portions thereof. In this way, the sustainability platform system 72 may rely on alternative data sources to acquire other information if it cannot be sourced from integrated business systems, when business system data does not go to the level of granularity needed to attribute spend to specific action deployment or operation, and the like. As with the other datasets received at blocks 292-300, if the change in sustainability parameters is greater than some threshold, the sustainability platform system 72 may identify abatement technologies, updated action plans 90, or the like to provide an immediate remedy. In some embodiments, the user input data may include adjustments to the action plan 90, thereby allowing manual additions or subtractions of parts of the action plan 90 to enable user control to counter the undesired sustainability parameters. After receiving the manual changes, the action plan 90 may be a sub-optimal solution, so the sustainability platform system 72 may implement the re-optimization process to take the change in actions into account.

With the foregoing in mind, it should be noted that for image data (e.g., satellite), IoT data, and user input data (e.g., emissions), the sustainability platform system 72 may review the changes in the sustainability parameters to understand the causes of the changes, as this could potentially impact how the action plan 90 should be updated. For example, if collecting satellite data over a geographic area containing multiple point sources, there may be multiple reasons as to why an emissions spike may be observed (e.g., fugitive emissions from leaking infrastructure versus unplanned venting to reduce pipeline pressure for example). The reason for the spike may dictate the type of action that needs to be taken to reduce the emissions, which may be ignored during re-optimization if the sustainability platform system 72 determines that including the action would produce a sub-optimal result.

Before continuing, it should be noted that the descriptions provided above are merely example input data that the sustainability platform system 72 may use to perform the method 290. Further, the sustainability platform system 72 may also consider other data sources that are described herein or may not be listed above.

At block 304, the sustainability platform system 72 may generate the sustainability model for the enterprise operations as described above with respect to FIG. 5. After generating the sustainability model, at block 306, the sustainability platform system 72 may receive updated data for any of the datasets received at blocks 292, 294, 296, 298, 300, and 302. That is, the sustainability platform system 72 may receive updated data from one of the data sources 74 described above. In some embodiments, when new or updated data is available, the respective data source 74 may send a notification or broadcast a notification to the sustainability platform system 72. The sustainability platform system 72 may continuously check the data sources 74 and determine whether the collected updated datasets changed with respect to some threshold compared to the previously acquired datasets.

As such, at block 308, the sustainability platform system 72 may determine whether a change has been detected in the updated dataset and the previously acquired dataset. That is, in some embodiments, the sustainability platform system 72 may determine whether the received datasets change more than a threshold amount. In some embodiments, the amount of detected change may be based on a threshold percentage difference defined by a user input. Additionally, the sustainability platform system 72 may perform trend analysis to determine whether a detectable trend (e.g., increasing, decreasing) based on a statistical analysis. If a change in the datasets is detected to be greater than the thresholds, the sustainability platform system 72 may proceed to block 310 and generate an updated sustainability model based on the updated data. In this way, the sustainability platform system 72 may continuously update the sustainability model for the enterprise as the input data sources 74 are updated. In addition to generating the sustainability model, the sustainability platform system 72 may perform any of the methods described above to provide updated results.

Referring back to block 308, if a change is not detected in the updated data (e.g., less than threshold amount), the sustainability platform system 72 may return to block 292 and continue receiving updated datasets. In some embodiments, the sustainability platform system 72 may aggregate the updated datasets and continue to compare the datasets to respective thresholds to determine whether an updated sustainability model should be created with the updated data. If, however, the sustainability platform system 72 determines that an updated sustainability model has been created, the sustainability platform system 72 may proceed to block 196 of the method 190 and receive the sustainability target data to determine updated action plans 90 to improve sustainability factors for the enterprise. That is, the sustainability platform system 72 may determine whether the updated sustainability model will continue to meet the sustainability goals of the enterprise and provide updated action plans in case the sustainability parameters are not expected to be acceptable. As such, the sustainability platform system 72 may continuously manage the operations of the enterprise to ensure that the sustainability parameters are continuously improved as conditions change within the enterprise.

In some embodiments, after the sustainability platform system 72 collects a threshold amount of updated data, the sustainability platform system 72 may generate a regression model (e.g., sustainability could be built to predict expected changes in sustainability parameters due to changes in other detected parameters. If actual sustainability parameters exceed threshold levels predicted from other physical factors, such, the sustainability platform system 72 may trigger a re-optimization process, which may help to identify reasons for spikes in the sustainability parameters beyond the assumptions made from other data types (such as cost data).

Monitoring actual sustainability factors against the forecasted business-as-usual sustainability factors may also provide a link between sustainability factor spikes and changes in production. Where actual sustainability factors are above the business-as-usual case for a given time period may be a trigger for re-optimization, although in this instance the total sustainability factor (e.g., emissions) constraint placed on the optimization would be changed, rather than any input data associated with actions themselves.

Referring back to FIG. 8, after generating the updated sustainability model for the enterprise based on the updated data, the sustainability platform system 72 may proceed to block 196 of the method 190 and receive the sustainability target data to determine updated action plans 90 to improve sustainability factors for the enterprise. That is, the sustainability platform system 72 may determine whether the updated sustainability model will continue to meet the sustainability goals of the enterprise and provide updated action plans in case the sustainability parameters are not expected to be acceptable. As such, the sustainability platform system 72 may continuously manage the operations of the enterprise to ensure that the sustainability parameters are continuously improved as conditions change within the enterprise.

Figure 9:
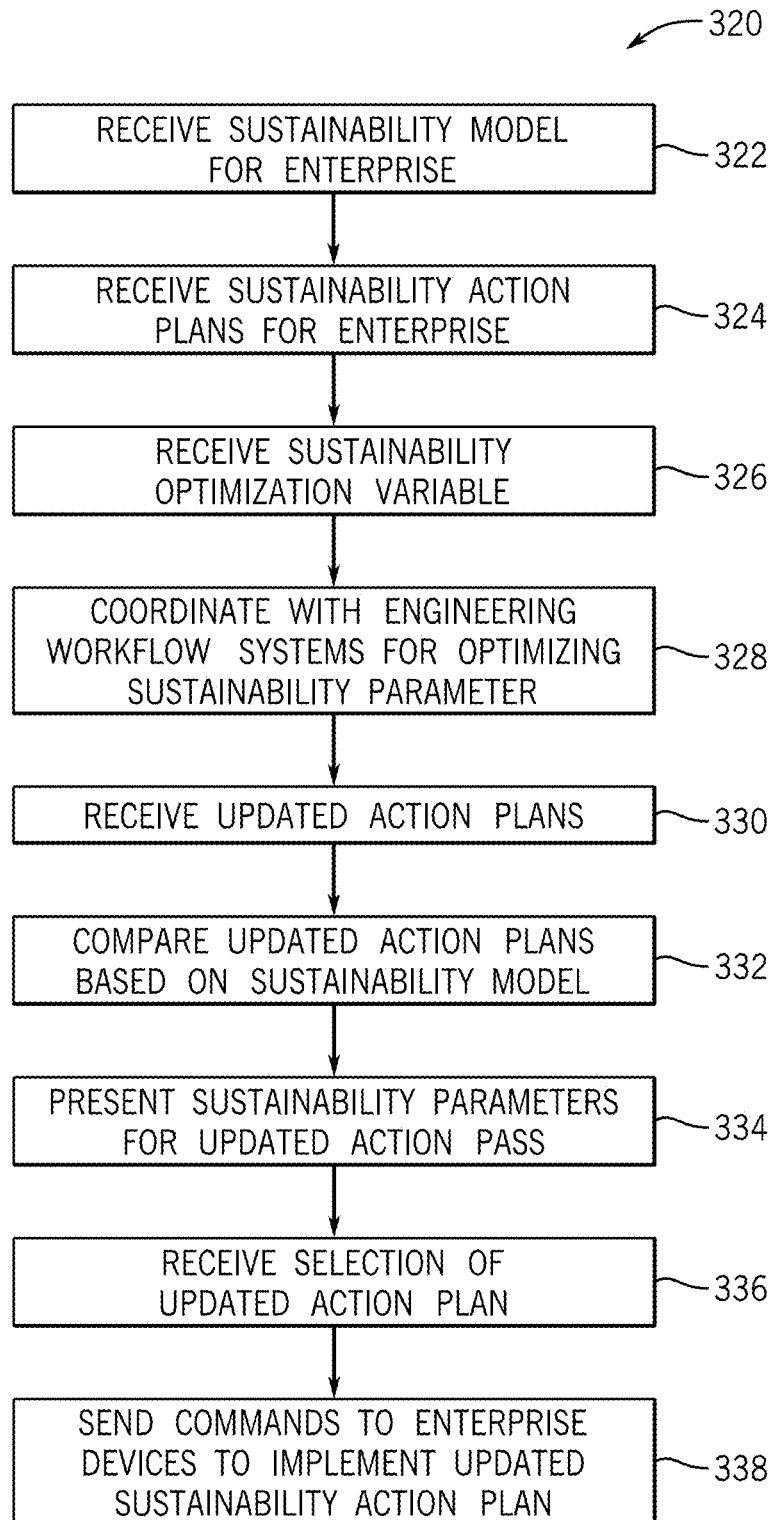
FIG. 9 illustrates a flow chart of a method for optimizing sustainability action plans based on one or more sustainability optimization parameters, according to one or more embodiments of this disclosure.

In addition to simulating application plans 90 as described above, the present embodiments described herein may be employed to determine or identify sustainability action plans 90 that are optimized for various sustainability variables. With this in mind, FIG. 9 illustrates a flow chart of a method 320 for optimizing sustainability action plans 90 based on one or more sustainability optimization parameters, according to one or more embodiments of this disclosure. Although the following description of the method 320 is described as being performed by the sustainability platform system 72 and in a particular order, it should be understood that any suitable computing system with access to the appropriate data sources may perform the method 320 in any suitable order.

At block 322, the sustainability platform system 72 may receive the sustainability model for the enterprise as described in various methods above. In addition, at block 324, the sustainability platform system 72 may receive sustainability action plans 90 from the engineering workflow systems 78 as described above. The sustainability model may represent the current state in which the enterprise is operating with respect to sustainability parameters, and the action plans 90 may correspond to the current operational functions being performed within the production system, the buildings, or both.

At block 326, the sustainability platform system 72 may receive a sustainability optimization variable for optimization. The sustainability optimization variable may be received via user input through the manual source 112 or the like. In some embodiments, the sustainability platform system 72 may receive the sustainability optimization variable from other data sources such as regulation data, engineering workflow systems 78, or the like. The sustainability optimization parameter may correspond to one or more sustainability parameters that the sustainability platform system 72 may consider optimizing when generating the action plans 90. For example, if the user selects energy as the sustainability optimization variable, the sustainability platform system 72 may generate action plans 90 that reduces energy regardless of the effects on other sustainability parameters. In addition to or in lieu of sustainability parameters, at block 326, the sustainability platform system 72 may receive some other parameter to use for performing its optimization operations. For example, the sustainability platform system 72 may receive costs as an optimization variable. As such, the sustainability platform system 72 may generate the action plans 90 that may be implemented at the lowest costs for the enterprise.

By way of example, the sustainability optimization variable that the sustainability platform system 72 may receive may include optimizing for a volume of carbon dioxide equivalent ($CO_2e$). The carbon dioxide equivalents correspond to a standardized measure for comparing various greenhouse gases (GHGs) based on global warming potentials. Since each different type of GHG can trap heat in different ways, the carbon dioxide equivalent ($CO_2e$) may provide a way to express the impact of different gases in terms of equivalent amounts of carbon dioxide. With this in mind, the sustainability optimization parameter may also include a volume of any individual greenhouse gas (e.g., Carbon dioxide, Methane, Nitrous oxide, Halogenated gases, Nitrogen oxides and others).

As mentioned above, the sustainability optimization variable may also include cost data, such as capital expenditure (e.g., total or per year) for enterprise operations, facility operations, or both; operating expenditure as a function of activity (e.g., total or per year) for enterprise operations, facility operations, or both; operating expenditure as a function of capacity (e.g., total or per year) for enterprise operations, facility operations, or both; and the like.

In addition, the sustainability optimization variable may be related to raw material costs, utility costs, and the like. For instance, the sustainability optimization parameter may include a commodity demand, such as a number of barrels of oil, a number of barrels of oil equivalent, cubic feet or British thermal units for oil and gas production, and the like. In the same manner, the sustainability optimization parameters may include a number of joules, watts or kilowatt hours for energy and/or electricity production associated with enterprise operations, facility operations, or both. In the same manner, the sustainability optimization parameters may include a number of tons of cement, steel, chemicals or other manufactured commodity; a number of kilograms of hydrogen, ammonia, or other chemical; and the like.

The selection of which sustainability variable to optimize could be executed in a number of ways in addition to manual selection by the user, as described above. Briefly, manual selection would enable the user to specify which parameter to optimize, such as minimum cost, maximum emission reduction (reduction in greenhouse gas volume), or maximum commodity production. However, it should be noted that the sustainability optimization variable may also be received at block 326 by other entities, such as a computing system, a monitoring system, the sustainability platform system 72, or the like.

For example, the sustainability optimization variable may be specified based on a detected change in input data as described above. That is, if a particular input dataset has changed, the input dataset or the related parameters may be used as the sustainability optimization variable. Examples of potential triggers for automatically designating sustainability optimization variable may include determining if the marketplace data 104 pertaining to the capital and operating costs of individual actions within a plan increases, this could trigger optimization for minimum cost. In the same manner, if the volume of methane detected by satellite imagery increases, this could trigger optimization for maximum methane (volume) reduction. Additionally, if production volume decreases, as detected by IoT devices 44 at the facility or by a periodic check of corporate business systems recording production volume, this could trigger optimization for maximum commodity production.

With the foregoing in mind, the selection of the one or more sustainability optimization variables may be triggered by an artificial intelligence (AI) or machine learning model that recognizes or selects the appropriate sustainability parameter to optimize based on external data. For example, natural language processing of industry publications that describe changes to legislation (e.g., increase in the methane fee imposed in the United States) could identify how and when changes may be occurring, and consequently trigger an optimization for minimum cost to reflect the new impact of the changing fees. Similar natural language processing models could be used to analyze sentiment from published news sources, for example to detect an increase in focus on maximizing emission reduction, and then trigger an optimization for the same parameter. This type of optimization trigger could be useful for optimizing action plans ahead of any formal changes in emission reduction targets that a company may implement.

Although the foregoing examples of the sustainability optimization variables detail a particular set of parameters, it should be understood that these parameters are merely provided as examples. That is, the embodiments described herein should not be limited to those listed as examples.

At block 328, the sustainability platform system 72 may coordinate with engineering workflow systems to determine action plans 90 that optimize for the variable received at block 326. That is, in some embodiments, based on the optimization variable, the sustainability platform system 72 may identify one of the engineering workflow systems 78 that may be designed to provide recommendations for optimizing the selected optimization variable. The respective engineering workflow system 78 may then receive the sustainability action plans 90 received at block 324 that may correspond to the action plans 90 currently implemented by the enterprise. The respective engineering system 89 may then use the sustainability model for the enterprise and the currently implemented action plans 90 to determine updated action plans to optimize or improve the sustainability optimization parameter.

In addition to or in lieu of coordinating with the engineering workflow systems 78, in some embodiments, the sustainability platform system 72 may analyze the currently implemented sustainability action plans 90 and identify a subset of action plans 90 that inhibit the ability of the enterprise to optimize the sustainability optimization parameters via the planning block 86. As such, the sustainability platform system 72 may determine an updated set of action plans 90 to implement for the enterprise to optimize the sustainability optimization parameters.

At block 330, the sustainability platform system 72 may receive the updated action plans 90 from the engineering workflow system(s) 78, the planning block 86, or both. With this in mind, in some embodiments, the sustainability platform system 72 may use constraints on the updated action plans 90 to ensure that the final result stays within limits dictated by a secondary sustainability parameter. That is, there is a risk that the final result will be suboptimal, however placing constraints enables more realistic action plans 90 to be created or approved as options to be presented by the sustainability platform system 72.

Examples of constraints that can be placed on the optimization include a total cost constraint on an optimization for maximum emission reduction to ensure the final solution does not exceed a budgetary limit. Another example constraint may include an emission reduction target on an optimization for minimum cost. This would ensure the final solution contains a selection of actions that can meet yearly and total emission reduction goals. Another example constraint may include a total emission target on an optimization for maximum commodity production. This would ensure the final solution does not exceed an emission ceiling as production is maximized.

Keeping this in mind, it should be noted that the same methods for selecting an optimization variable described above at block 326 could also be applied to selecting an appropriate constraint to place on the optimization. For example, if the enterprise revises its production forecasts, a regression model could be trained to predict a range of achievable emission reduction targets based on past business performance and comparative companies. The predicted emission reduction target could be added as a constraint onto a new minimum cost optimization. In another example, if budgets are updated within a corporate business system, the new spend limits could be added as a constraint onto a new maximum emission reduction optimization.

At block 332, the sustainability platform system 72 may compare the received action plans 90 via the comparison block 88. As such, the sustainability platform system 72 may simulate implementing the updated action plans 90 based on the sustainability model for the enterprise and various machine learning or artificial intelligence modeling techniques. As such, the sustainability platform system 72 may forecast or predict expected sustainability parameters over time for the enterprise. The expected sustainability parameters may include the sustainability optimization parameters, as well as other sustainability parameters.

At block 334, the sustainability platform system 72 may present the results of the comparisons including the expected values for the sustainability optimization parameter(s) via a notification sent to a user device, via an electronic display, or the like. In addition to the expected values for the sustainability optimization parameter(s), the sustainability platform system 72 may present the expected values for the other sustainability parameters. In this way, a user may recognize the overall effects to other sustainability parameters when optimizing for any other particular sustainability parameter.

At block 336, the sustainability platform system 72 may receive a selection of the updated action plans 90 via user input. In some embodiments, the sustainability platform system 72 may automatically select the action plan that provides the most effective expected improvement for the sustainability optimization parameters received at block 326. At block 338, the sustainability platform system 72 may send relevant commands to various enterprise devices to implement the updated sustainability action plan 90. Additionally, the sustainability platform system 72 may send the selected action plan 90 to the user's device via a notification or other suitable communication method as described above.

In some cases, users may wish to evaluate sustainability action plans 90 with respect to an effectiveness of the respective sustainability action plans 90. As such, the sustainability platform system 72 may simulate the sustainability parameters for various sustainability action plans 90 with respect to a number of sustainability variables. In this way, the user may prioritize action plans 90 in view of their respective effectiveness with regard to improving sustainability parameter values for respective sustainability variables.

Figure 10:
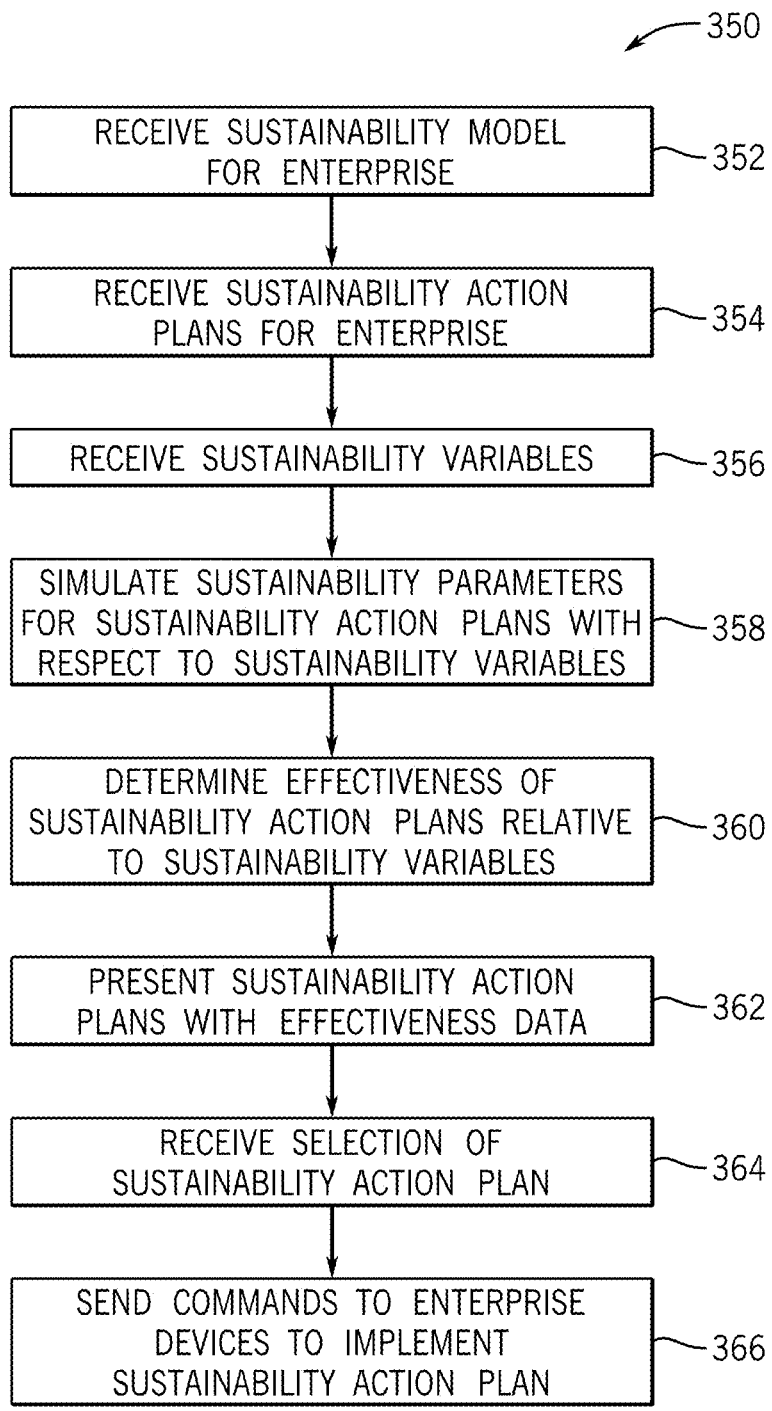
FIG. 10 illustrates a flow chart of a method for determining effectiveness of sustainability action plans for an enterprise over a period of time, according to one or more embodiments of this disclosure.

FIG. 10 illustrates a flow chart of a method 350 for determining effectiveness of sustainability action plans 90 for an enterprise over a period of time, according to one or more embodiments of this disclosure. Although the following description of the method 350 is described as being performed by the sustainability platform system 72 and in a particular order, it should be understood that any suitable computing system with access to the appropriate data sources may perform the method 350 in any suitable order.

Referring to FIG. 10, at block 352 and block 354, the sustainability platform system 72 may receive the sustainability model for the enterprise and the sustainability action plans 90 determined for the enterprise as described with reference to the details above. The sustainability action plans 90 may include action plans 90 provided by various or a combination of different engineering workflow systems 78, the planning block 86, or the like.

At block 356, the sustainability platform system 72 may receive one or more sustainability variables that correspond to subsets of the sustainability parameters provided in the sustainability model. The sustainability variables may be defined by user inputs, detected in updated regulations or rules for the enterprise, updated corporate mandates or goals, and the like. For example, the sustainability variables may be related to GHG emissions, energy consumption, or the like.

At block 358, the sustainability platform system 72 may simulate implementing the updated action plans 90 based on the sustainability model for the enterprise and various machine learning or artificial intelligence modeling techniques. As such, the sustainability platform system 72 may forecast or predict expected sustainability parameters over time for the enterprise. The expected sustainability parameters may include the sustainability optimization parameters, as well as other sustainability parameters.

In some embodiments, the sustainability platform system 72 may simulate evaluating the action plans 90 as an optimization problem that may be executed a specified number of times using the same input parameters (e.g., 50 times). The result of these optimization runs could then be presented to the user (at block 362). By performing the optimization run a number of times, a wide variety of combinations of action plans 90, operational details for action plans, and other factors may be considered and evaluated for the users' benefit.

By way of example, evaluating the action plans 90 as an optimization problem may include simulating the effects of each of the action plans 90 to find the best or optimized solution for one or more sustainability parameters. As such, the sustainability platform system may employ Linear Programming (LP) algorithms for solving linear programming problems; Nonlinear Programming (NLP) algorithms such as Gradient Descent, Newton's Method, Quasi-Newton Methods, Conjugate Gradient Method, and the like; Integer Programming algorithms such as Branch and Bound or Branch and Cut; Metaheuristic Algorithms, Convex Optimization; Dynamic Programming that breaks down problems into simpler subproblems; Lagrange Multipliers that may be used for constrained optimization problems; and the like.

Referring back to FIG. 10, based on the simulated sustainability variables, at block 360, the sustainability platform system 72 may determine the effectiveness of the sustainability action plans 90 relative to the sustainability variables. That is, the sustainability platform system 72 may analyze the expected sustainability parameters associated with the sustainability variables received at block 356 to track their values over time. In this way, the sustainability platform system 72 may determine the effectiveness in achieving each sustainability variable for each respective sustainability action plan 90. Indeed, the sustainability platform system 72 may analyze each sustainability action plan 90 relative to each sustainability variable, such that the sustainability platform system 72 may also modify each of the sustainability action plans 90 to provide further improved sustainability action plans 90 for each of the sustainability variables.

The effectiveness of the sustainability action plans 90 relative to each of the sustainability variables may be depicted as percentage improvements relative to current operations of the enterprise. In this way, users may analyze each of the sustainability action plans 90 with respect to different sustainability variables and their respective improvements to the current enterprise operations.

An alternative method for evaluating optimized action plans could involve running multiple optimization algorithms using the same input parameters for each of the received action plans 90. As the optimization itself is deterministic, the sustainability platform system 72 may assume that two optimization runs using the same input parameters could yield different results, with this becoming more likely as the complexity of the optimization problem grows (for example as the number of parameters increases).

In some embodiments, some evaluation methodologies for evaluating the optimized action plans that may be implemented by the sustainability platform system 72 may include combining identical results of optimization runs and showing the proportion of the total runs that produced the result (e.g., 20 out of the 50 runs). In addition, the sustainability platform system 72 may applying a weighting to certain sustainability parameters to preferentially show the runs that favor the higher weighting (e.g., applying a higher weighting to selection of a particular action would preferentially show the runs in which that action was selected in the plan). Additionally, the sustainability platform system 72 may plot the optimization runs spatially against sustainability parameters to help the user understand the deviation from those parameters. For example, plotting the runs as a function of total cost and total emission reduction would give a visual representation of each run's deviation from the optimal values (assumed to be lowest cost and highest emission reduction).

In some embodiments, the sustainability platform system 72 perform an automated evaluation methodology. For example, similar, to the above-described method, after an optimization has been run a specified number of times using the same input parameters, results could be automatically filtered using statistical methods. For example, the sustainability platform system 72 may extract the $10^{th}$ percentile, $50^{th}$ percentile, the $90^{th}$ percentile, or any other suitable percentile run results, assuming a normal distribution. In some embodiments, the sustainability platform system 72 may select runs that fall into a standard deviation of a single parameter (such as total cost). In another automated evaluation methodology, the sustainability platform system 72 may perform uncertainty analysis to determine the impact of uncertainties in action input data (such as cost, emissions reduced etc.) or in future business production (used to compute the business-as-usual emissions forecast prior to optimization). The results of these evaluations may be used as quantifiers for effectiveness evaluations of the respective action plans 90.

Additionally, the sustainability platform system 72 may determine the effectiveness of each of the sustainability action plans 90 based on a comparison of sustainability action plans 90 using logic comparison and other suitable analysis techniques. For instance, the sustainability platform system 72 may evaluate each of the action plans 90 with respect to an optimization result. That is, the sustainability platform system 72 may identify one or more of the action plans 90 based on which action plan 90 produced the best optimization result for the specified sustainability variable (e.g., has the lowest cost if optimization for minimum cost, or the most emission reduction if optimizing for maximum emission reduction). Another analysis technique may include identifying the action plans 90 that stayed within one or more constraints. That is, the sustainability platform system 72 may identify one or more of the action plans 90 that produced the best optimization result and stayed within a constraint (i.e. has the lowest cost and did not exceed the emission target). In yet another analysis technique, the sustainability platform system 72 may determine an impact on single sustainability parameter or identify the action plan 90 which had the greatest impact on a sustainability parameter that was not specified for optimization or by any constraint (i.e. had the lowest carbon tax, had the highest potential revenue, had the lowest capital expenditure).

The sustainability platform system 72 may also employ an action deployment timeline analysis to determine which action plan 90 that had a more desirable or realistic action deployment timeline (i.e. deployed actions over multiple years rather than all actions deployed in the first year of the simulation). In the same manner, the sustainability platform system 72 may evaluate a time to reach emission reduction target to determine which action plan 90 meets the emission target first, given the cost constraint or other suitable constraint is not exceeded.

At block 362, the sustainability platform system 72 may present the sustainability action plans 90 with the effectiveness data (e.g., sustainability variable improvement data, percentage improvement data). The action plans 90 may be presented via the user device, a notification, or any suitable method as described above.

Since the action plans 90 can be generated over different time spans, any visual or numerical comparison may include information regarding the simulation timeframe to avoid incorrect assumptions (for example when viewing a numerical comparison of total emission reduction, the total time frame and the average emission reduction rate per year may also be shown to provide context). In some embodiments, the sustainability platform system 72 may feed the effectiveness data and comparisons between the action plans to an AI model that may can learn from plan comparisons, such that selection and implementation that can later be used to recommend plans to users.

When a user is comparing the action plans 90, the sustainability platform system 72 may generate a score for each action plan 10 based on how well they meet certain criteria. As such, in some cases, the sustainability platform system 72 may employ a ranking system (e.g., minimum cost optimized plans from lowest cost to highest cost). In other cases, when decision making is taking multiple factors into account, the sustainability platform system 72 may solicit scoring by the user. For example, the user may provide the sustainability platform system 72 with scores for the action plans 90 according to a numerical scale from 1-9 representing how well each plan meets the user's criteria for plan selection. In this way, the sustainability platform system 72 may allow the user to take a more holistic evaluation of costs, emission reduction, action deployment timeline, and other factors into account when evaluating the action plans 90.

In some embodiments, an AI model could be trained to recognize the relationship between the user defined score and other quantitative data in the plan (e.g., recognizing that low scores are often assigned to plans that exceed budget constraints by more than 10%). In addition, the AI model may be tailored for each user based on user's previous selections given the respective effectiveness evaluations of the respective action plans 90.

At block 364, the sustainability platform system 72 may receive a selection of one or more of the action plans 90 presented at block 362. When a user selects a particular action plan 90 to implement, information related to the reasons in which the action plan 90 was selected can be requested and saved by the sustainability platform system 72. The collected information may include specifying which sustainability parameter was the most important to the user, any quantitative data that provided reasoning for the selection (such as plan x was chosen because the cost was 10% lower than the next best plan), general statements to explain their selection, and the like. The collected information may be provided as training data to the AI model to better predict suitable action plans 90 to recommend to the respective user in the future.

With this in mind, the AI model could also be trained to learn from the action selections that the user is making prior to optimization. That is, common patterns across different action variables could be established and used to preferentially select actions for future optimizations. For example, if plans created to address a particular emission scope in a given geography often include similar subsets of actions (such as installing vapor recovery units across gas processing facilities in the southern United States), then when future plans are created in the same geography to address the same scope or problem, these previously selected actions could be recommended.

At block 366, the sustainability platform system 72 may send a notification to the user device or other suitable component to indicate that the sustainability action plan 90 has been selected by the user. That is, the selected action plan 90, the determined effectiveness of the selected action plan 90, or other suitable information may be sent as a notification to other devices. In addition, the sustainability platform system 72 may send commands to relevant devices to adjust operations in accordance with the selected action plans 90 as described above.

Similar to simulating the effectiveness of action plan 90, the sustainability platform system 72 may track the effectiveness of implemented action plans 90. As such, the sustainability platform system may use the tracked effectiveness information to inform users or make recommendations in future action selection solicitations. For example, if a plan contains an action to switch to dissolvable frac plugs and the actual scope 1 emission reduction from not having to remove the frac plugs by drilling is 30% more than forecast, this action could be preferentially recommended for future plans that are trying to address the same scope in the same part of the value chain. It should be noted that the tracked effectiveness may also be provided to the AI model to enable the AI model to better estimate predicted or simulated effectiveness for future action plan recommendations and the like.

As mentioned above, users may wish to evaluate sustainability action plans with respect to an effectiveness of the respective sustainability action plans 90 and its effects to multiple sustainability factors before selecting one to implement. That is, even if the sustainability platform system 72 does not receive a particular sustainability optimization parameter or variable to optimize, as described above with reference to FIG. 9, the generated or received action plans 90 may be characterized based on the effectiveness of the respective plans 90 with respect to various or a collection of sustainability parameters. As such, the sustainability platform system 72 may simulate the sustainability parameters for various sustainability action plans 90 with respect to a number of sustainability variables. In this way, the user may prioritize the action plans 90 in view of their respective effectiveness with regard to improving sustainability parameter values for respective sustainability variables.

In some embodiments, the sustainability platform system 72 may update or generate sustainability action plans based on certain sustainability footprint reports. For instance, the sustainability platform system 72 may determine an effectiveness of sustainability action plans based on greenhouse gas (GHG) footprint evolution reports for an enterprise.

Figure 11:
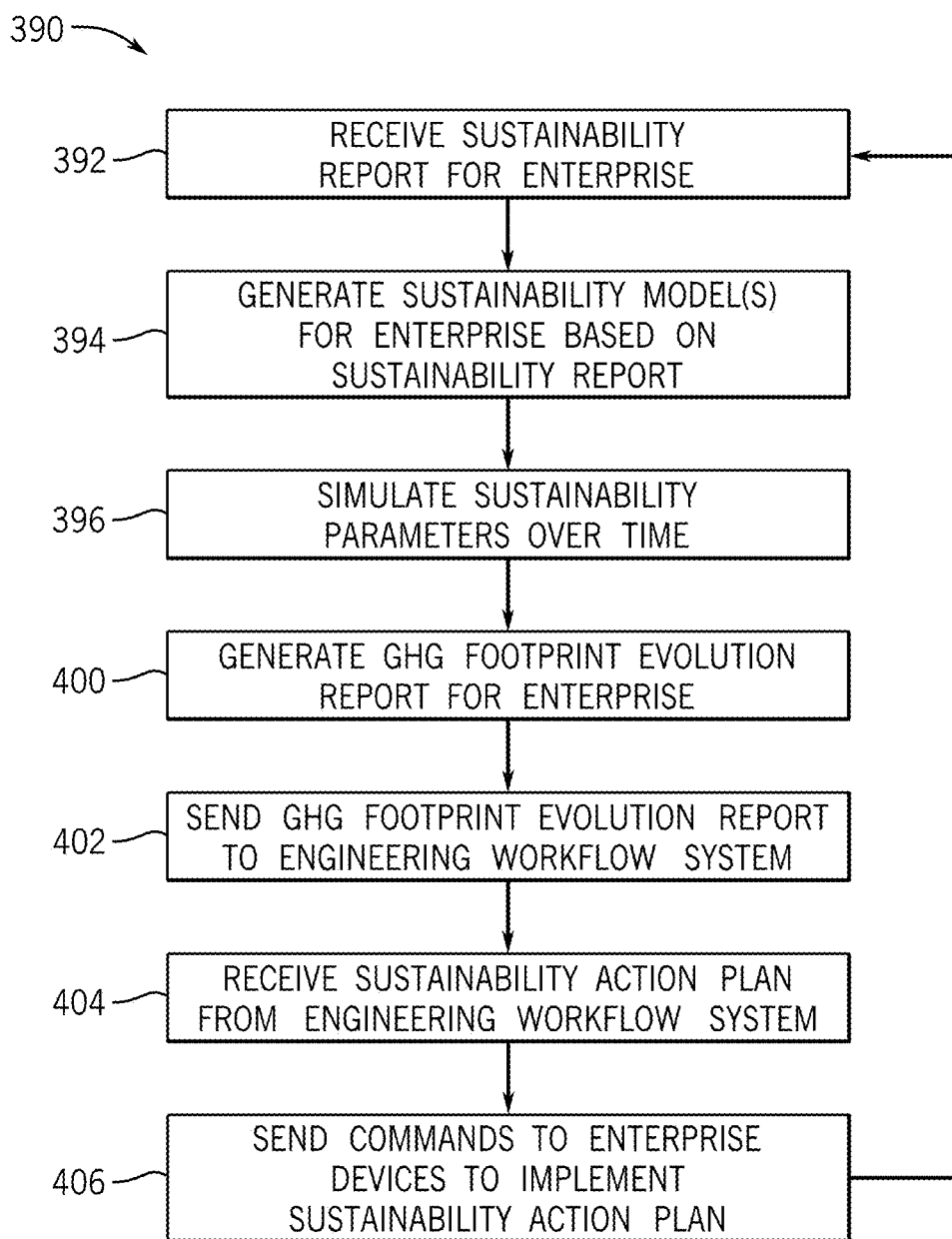
FIG. 11 illustrates a flow chart of a method for determining effectiveness of sustainability action plans based on greenhouse gas (GHG) footprint evolution reports for an enterprise, according to one or more embodiments of this disclosure.

In a particular embodiment, the sustainability platform system 72 may update or generate sustainability action plans 90 based on certain sustainability footprint reports. For instance, FIG. 11 illustrates a flow chart of a method 390 for determining effectiveness of sustainability action plans 90 based on greenhouse gas (GHG) footprint evolution reports for an enterprise, according to one or more embodiments of this disclosure. Although the following description of the method 390 is described as being performed by the sustainability platform system 72 and in a particular order, it should be understood that any suitable computing system with access to the appropriate data sources may perform the method 390 in any suitable order.

Referring to FIG. 11, at block 392, block 394, and block 396, the sustainability platform system 72 may receive the sustainability report, generate the sustainability model, and simulate the expected sustainability parameters over a period of time for the current operational schedule of the enterprise as described above. The simulated sustainability parameters, in some embodiments, may correspond to expected GHG emissions over the period of time. The GHG emissions may include carbon dioxide emissions or other suitable emissions.

In some embodiments, at block 392, the sustainability report may include a Carbon Disclosure Project (CDP) report that includes information on environmental impacts, including their greenhouse gas emissions, water usage, and climate change strategies. The CDP report may include data regarding various scopes of emissions, such as Greenhouse Gas (GHG) emissions including direct (Scope 1) and indirect (Scope 2 and Scope 3) greenhouse gas emissions; energy usage including information on energy consumption and energy efficiency measures; water management such as data on water usage, risks related to water resources, and water stewardship practices; climate change strategies such as details on how companies assess and manage climate-related risks and opportunities; biodiversity and land use data such as impact on ecosystems and measures to mitigate negative effects; and the like. As such, the CDP report may include information related to the action plans 90 implemented within the enterprise. In some embodiments, the CDP report may be published on an accessible network location (e.g., Internet), retrieved from a database associated with the enterprise, scraped via electronic news sources, and the like.

In addition, the sustainability report may include an enterprise report providing an overview of the enterprise operations and buildings 56 of the enterprise. The enterprise report may allow the sustainability platform system 72 to drill down or identify various assets or equipment that may be accessible to retrieve data or may have data associated therewith stored in another data storage component or the like. The assets may provide Scope 1 type emissions data in real time via IoT devices 44, SCADA systems, historian systems, and the like. By way of example, the IoT device 44 may include a network-connected electronic submersible pump (ESP) that may assist in hydrocarbon production when well pressure is less than some threshold, as discussed above. The equipment may provide manufacturer data that provides information related to operational parameters and corresponding energy consumption, emissions, and the like. In some embodiments, the equipment may provide input voltage, output voltage, frequency, inlet/outlet pressure, and other datasets that may be useful for the sustainability platform system 72 to generate the sustainability model, determine GHG emissions, determine various scope emissions, and the like.

Additional equipment that may provide additional information related to electricity consumption. For instance, heaters and separators may be used to perform certain processing operations for extracted hydrocarbons during midstream or downstream operations. These devices may provide information related to energy consumption that may be used to determine Scope 2 or 3 type emissions related to their respective operations.

In some embodiments, the sustainability report may include time series data related to the respective operations. For example, in fracking operations, data from respective equipment (e.g., trucks, vehicles, pumps) deployed in the fracking environment may be collected and used to generate a sustainability model (e.g., block 394) to characterize the various types of Scopes of emissions related to the respective operations.

At block 394, the sustainability platform system 72 may generate the sustainability model based on the collected information and other information sources, as described in various embodiments herein. At block 400, the sustainability platform system 72 may generate a GHG footprint evolution report for the enterprise operations over a period of time. In some embodiments, the period of time may correspond to the expected life of the reservoir associated with the production. The GHG footprint evolution report may indicate an overall GHG footprint for the enterprise operations over the course of time that corresponds to the life of the reservoir. In some embodiments, the GHG footprint evolution report may correspond to a carbon footprint evolution report that provides a measurement of an amount of carbon dioxide and other carbon compounds emitted due to the consumption of fossil fuels by the enterprise.

The GHG footprint evolution report may include an analysis of the changes in the GHG emissions for the enterprise over time in the past and the expected changes in the GHG emissions in the future. The GHG footprint evolution report may also include historical data and expected trends for various GHG emissions (e.g., different scopes). In some embodiments, the GHG report may include a baseline year for tracking the GHG emissions and a year-by-year (e.g., or other suitable time period) analysis that presents GHG emissions data for each year since the baseline, showing absolute emissions and intensity metrics (e.g., emissions per unit of production or revenue). The GHG report may include an emissions breakdown portion that indicates the emissions data according to source (e.g., analysis of emissions by different sources such as fuel combustion, industrial processes, transportation), business unit or location (or other part of enterprise), scope, or the like. Since the GHG report may indicate a particular source for the emissions, the sustainability platform system 72 may use the determined source as an input to identify a suitable engineering workflow system 74 as described below.

In some embodiments, the GHG report may encompass various stages of hydrocarbon production, as discussed above with respect to FIG. 1. By way of example, the GHG report may capture GHG emissions over exploration/development operations (e.g., seismic exploration, drilling), production operations (e.g., producing hydrocarbons from the well), maintenance operations for various equipment used in the production, surface operations in preparing the hydrocarbons for transport or use (e.g., gas liquification), transportation of the hydrocarbons, and the like. In some embodiments, the sustainability platform system 72 may employ an Oil Production Greenhouse Gas Emissions Estimator (OP-GEE) model to estimate the GHG emissions associated with the production of the hydrocarbons throughout the various stages of hydrocarbon extraction and processing.

The GHG report may thus correspond to a model of the GHG emissions over time, over the expected operations of the enterprise, and the like. To generate the GHG report, the sustainability platform system 72 may analyze field characteristics, such as data on the geological and operational characteristics of the oil field, such as reservoir depth, pressure, and oil quality. In addition, the sustainability platform system 72 may analyze operational practices including information on the technologies and practices used in oil production, such as enhanced oil recovery techniques and water management. The sustainability platform system 72 may also consider energy consumption data regarding an amount and type of energy used in production processes, as well as emission factors, such as specific emission factors for different types of equipment and processes.

The sustainability platform system 72 may use various methodologies to simulate the GHG emissions and generate the GHG report. For instance, the sustainability platform system 72 may use a process-based approach to model each step of the oil production process and its associated emissions. The sustainability platform system 72 may also use a modular structure allowing users to customize and adapt it to specific fields or production scenarios. In addition, the sustainability platform system 72 may employ a Monte Carlo simulation to account for uncertainties and variability in input data, providing a range of possible emission outcomes.

At block 402, the sustainability platform system 72 may send the GHG footprint evolution report to a particular engineering workflow system 78 for analysis to determine action plans 90 for improving the GHG measurements. In some embodiments, the sustainability platform system 72 may identify the suitable engineering workflow system 78 in accordance with embodiments described above with respect to abatement technologies and the like. In addition, the GHG footprint evolution report may be processed by the planning block 86 to determine action plans 90 to offset the carbon production values.

In addition, the sustainability platform system 72 may use elements of the GHG footprint evolution report to identify the suitable engineering workflow system 74. That is, the GHG footprint evolution may provide information related to emissions associated with various stages of operations such exploration/development operations (e.g., seismic exploration, drilling), production operations (e.g., producing hydrocarbons from the well), maintenance operations for various equipment used in the production, surface operations in preparing the hydrocarbons for transport or use (e.g., gas liquification), transportation of the hydrocarbons, and the like. This information may help narrow the field of abatement technologies or engineering workflow systems 74 that may be suitable for reducing the GHG emissions.

In some embodiments, the sustainability platform system 72 may send the GHG evolution footprint report in response to the GHG emissions for a particular asset, hierarchical level of the enterprise, portion of the enterprise operations, or other suitable measurement exceeds a threshold. In this way, the sustainability platform system 72 may limit the number of times that the action plans 90 may be adjusted or changed. Further, this limitation may allow the sustainability platform system 72 to modify operations for situations in which the GHG emissions can be reduced by changes to operations.

As discussed above, the action plans 90 may be related to improved operational schedules or setting for devices. However, in some embodiments, the action plans 90 or the identified engineering workflow systems 74 may be related to prognostic health management systems. Prognostic health management systems may include monitoring the efficiencies, maintenance schedules, lifespans, and other lifecycle (e.g., end of life, obsolete product, support of component expired) of various assets or components. As such, the corresponding engineering workflow system 74 may receive information related to the existing assets and equipment for the enterprise operations, along with commissioning information (e.g., start date, operational hours), maintenance records (e.g., replaced parts, service visits, fluid replacement), and the like. The engineering workflow system 74 that implements prognostic health management services may follow strict inspection intervals and replacement intervals (e.g., based on end-of-life expectations) for various assets that are part of the enterprise. Moreover, real-time and/or aggregated sensor feedback may be used to determine failures and/or estimate near-future failures by the engineering workflow system 74. In view of the received contextual data regarding the enterprise and the respective GHG emissions, the engineering workflow system 74 may determine when to replace, upgrade, and/or decommission different components of the enterprise to achieve reduced GHG emissions.

The determinations regarding maintenance and replacement may be made based on the sustainability factors (e.g., GHG output, water usage, waste output, etc.) on a per-component or a per-asset basis and the like. For example, it may be recognized that a certain component is producing excess $CO_2$ as an effect of wear/aging, as compared to a new component that may be available as a replacement. As such, the engineering workflow system 74 may analyze the scope 1, 2, or 3 emissions costs for incorporating a new or upgraded component against the estimated extra $CO_2$ that is expected to be produced over the rest of the expected lifespan of the original component to determine when to replace/upgrade/decommission the original component.

At block 404, the sustainability platform system 72 may receive an action plan 90 from the engineering workflow systems 78 or may generate the action plan 90 via the planning block 86. The action plans 90 may provide improved enterprise operations for reducing GHG footprints over the life of the enterprise operations. At block 406, the sustainability platform system 72 may send commands to devices to adjust operations based on the action plans 90, send notifications to user devices regarding the action plans, or the like as described above.

In some embodiments, the action plans 90 may include an adjustment to operational schedule to facilitate recommended replacement products or components within the enterprise. That is, if the action plans 90 are related to prognostic health management services to replace or repair one or more assets or equipment in the enterprise, the sustainability platform system 72 may send commands to back up or redundant machines to take over operations being performed by the components that will be replaced at a certain time. In some embodiments, the sustainability platform system 72 may identify a suitable time to switch operations based on schedules of associated personnel that will make the change, the availability or arrival of the replacement component, the existing maintenance schedule for the equipment, and the like.

Reference throughout this specification to "one embodiment," "an embodiment," "embodiments," "some embodiments," "certain embodiments," or similar language means that a particular feature, structure, or characteristic described in connection with the embodiment may be included in at least one embodiment of this disclosure. Thus, these phrases or similar language throughout this specification may, but do not necessarily, all refer to the same embodiment. Although this disclosure has been described with respect to specific details, it is not intended that such details should be regarded as limitations on the scope of this disclosure, except to the extent that they are included in the accompanying claims.

Additionally, the methods and processes described above may be performed by a processor. Moreover, the term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the embodiments set forth in this disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method comprising:
receiving, via a computing system, a sustainability model indicative of a plurality of sustainability parameters associated with one or more enterprise operations, wherein the one or more enterprise operations correspond to production data corresponding to one or more operational tasks performed with regard to extracting hydrocarbons from a subsurface region of earth as part of a hydrocarbon production system, facility data corresponding to one or more utility operations within one or more buildings associated with an enterprise, or both;
simulating, via the computing system, implementing one or more action plans via a plurality of devices that correspond to the one or more enterprise operations over time to determine an amount of greenhouse gas (GHG) emissions associated with the enterprise over the time;
generating, via the computing system, a GHG footprint evolution report based on the amount of GHG emissions;
identifying, via the computing system, at least one of a plurality of engineering workflow systems configured to reduce the amount of GHG emissions based on the GHG footprint evolution report, wherein each of the plurality of engineering workflow systems corresponds to a separate computing device relative to the computing system and is configured to independently analyze the GHG footprint evolution report, and wherein the at least one of the plurality of engineering workflow systems is identified by:
broadcasting a request indicative of the GHG footprint evolution report to the plurality of engineering workflow systems;
querying a database comprising a list of abatement technologies associated with each of the plurality of engineering workflow systems, wherein each abatement technology of the list corresponds to a device associated with performing an operation to reduce the amount of GHG emissions; and
receiving one or more responses from the plurality of engineering workflow systems, wherein the plurality of engineering workflow systems are configured to provide the one or more responses based on an association between a respective abatement technology of each of the plurality of engineering workflow systems and the GHG footprint evolution report;
sending, via the computing system, the sustainability model to the at least one of the plurality of engineering workflow systems;
receiving, via the computing system, an action plan to improve the amount of GHG emissions from the at least one of the plurality of engineering workflow systems; and
automatically sending, via the computing system, one or more commands to the plurality of devices based on the action plan in response to receiving the action plan, wherein the plurality of devices is associated with performing the one or more operational tasks performed with regard to extracting the hydrocarbons from the subsurface region; and
in response to receiving the one or more commands:
adjusting, by the plurality of devices associated with the one or more operational tasks, one or more respective operations to control a flow of hydrocarbons from the subsurface region.

2. The method of claim 1, comprising:
receiving a carbon disclosure project (CDP) report; and
generating the sustainability model based on the CDP report.

3. The method of claim 1, comprising:
receiving real-time data from additional devices configured to measure scope 1 type emissions associated with the one or more enterprise operations; and
generating the sustainability model based on the real-time data.

4. The method of claim 1, comprising:
receiving real-time data from one or more sensors configured to measure scope 1 type emissions associated with the one or more enterprise operations; and
generating the sustainability model based on the real-time data.

5. The method of claim 1, comprising:
receiving electricity consumption data associated with the one or more enterprise operations;
determining scope 2 type emissions based on the electricity consumption data; and
generating the sustainability model based on the scope 2 type emissions.

6. The method of claim 1, wherein the one or more devices comprise an electronic submersible pump, a heater, a separator, or any combination thereof.

7. The method of claim 1, wherein the amount of greenhouse gas (GHG) emissions is simulated based on a process-based approach, a modular structure, a Monet Carlo simulation, or any combination thereof.

8. The method of claim 1, wherein the one or more action plans comprise one or more modifications to the one or more operational tasks, the one or more utility operations, or both.

9. A system, comprising:
a production system configured to produce a plurality of products over a time period as part of an enterprise;
a plurality of buildings associated with the enterprise;
a plurality of devices that correspond to one or more enterprise operations; and
a processing system comprising a memory configured to store instructions that cause the processing system to perform operations comprising:
receiving a sustainability model indicative of a plurality of sustainability parameters associated with one or more enterprise operations of the enterprise, wherein the one or more enterprise operations correspond to production data corresponding to one or more operational tasks performed with regard to extracting hydrocarbons from a subsurface region of earth as a part of the production system, facility data corresponding to one or more utility operations within the plurality of buildings associated with the enterprise, or both;
simulating implementing one or more action plans via the plurality of devices that correspond to the one or more enterprise operations over time to determine an amount of greenhouse gas (GHG) emissions associated with the enterprise over the time;
generating a GHG footprint evolution report based on the amount of GHG emissions;
identifying at least one of a plurality of engineering workflow systems configured to reduce the amount of GHG emissions based on the GHG footprint evolution report, wherein each of the plurality of engineering workflow systems corresponds to a separate computing device relative to the processing system and is configured to independently analyze the GHG footprint evolution report, and wherein the at least one of the plurality of engineering workflow systems is identified by:
broadcasting a request indicative of the GHG footprint evolution report to the plurality of engineering workflow systems;
querying a database comprising a list of abatement technologies associated with each of the plurality of engineering workflow systems, wherein each abatement technology of the list corresponds to a device associated with performing an operation to reduce the amount of GHG emissions; and
receiving one or more responses from the plurality of engineering workflow systems, wherein the plurality of engineering workflow systems are configured to provide the one or more responses based on an association between a respective abatement technology of each of the plurality of engineering workflow systems and the GHG footprint evolution report;
sending the sustainability model to the at least one of the plurality of engineering workflow systems;
receiving an action plan to improve the amount of GHG emissions from the at least one of the plurality of engineering workflow systems; and
automatically sending one or more commands to the plurality of devices based on the action plan in response to receiving the action plan, wherein the plurality of devices is associated with performing the one or more operational tasks performed with regard to extracting the hydrocarbons from the subsurface region, adjusting the one or more utility operations within the one or more buildings, or both; and
in response to receiving the one or more commands:
adjusting, by the plurality of devices associated with the one or more operational tasks, one or more respective operations to control a flow of hydrocarbons from the subsurface region;
adjusting, by the plurality of devices associated with the one or more utility operations, one or more operational schedules associated with the one or more buildings, one or more employees, or both; or both.

10. The system of claim 9, wherein the processing system performs the operations comprising:
receiving a carbon disclosure project (CDP) report; and
generating the sustainability model based on the CDP report.

11. The system of claim 9, wherein the processing system performs the operations comprising:
receiving real-time data from additional devices configured to measure scope 1 type emissions associated with the one or more enterprise operations; and
generating the sustainability model based on the real-time data.

12. The system of claim 9, wherein the processing system performs the operations comprising:
receiving real-time data from one or more sensors configured to measure scope 1 type emissions associated with the one or more enterprise operations; and
generating the sustainability model based on the real-time data.

13. The system of claim 9, wherein the processing system performs the operations comprising:
receiving electricity consumption data associated with the one or more enterprise operations;
determining scope 2 type emissions based on the electricity consumption data; and
generating the sustainability model based on the scope 2 type emissions.

14. The system of claim 9, wherein the one or more devices comprise an electronic submersible pump, a heater, a separator, or any combination thereof.

15. The system of claim 9, wherein the amount of greenhouse gas (GHG) emissions is simulated based on a process-based approach, a modular structure, a Monet Carlo simulation, or any combination thereof.

16. The system of claim 9, wherein the one or more action plans comprise one or more modifications to the one or more operational tasks, the one or more utility operations, or both.

17. A non-transitory computer-readable medium comprising computer-executable instructions configured to cause a computing system to perform operations comprising:
receiving a sustainability model indicative of a plurality of sustainability parameters associated with one or more enterprise operations, wherein the one or more enterprise operations correspond to production data corresponding to one or more operational tasks performed with regard to extracting hydrocarbons from a subsurface region of earth as part of a hydrocarbon production system, facility data corresponding to one or more utility operations within one or more buildings associated with an enterprise, or both;
simulating implementing one or more action plans via a plurality of devices that correspond to the one or more enterprise operations over time to determine an amount of greenhouse gas (GHG) emissions associated with the enterprise over the time;

generating a GHG footprint evolution report based on the amount of GHG emissions;

identifying, via the computing system, at least one of a plurality of engineering workflow systems configured to reduce the amount of GHG emissions based on the GHG footprint evolution report, wherein each of the plurality of engineering workflow systems corresponds to a separate computing device relative to the computing system and is configured to independently analyze the GHG footprint evolution report, and wherein the at least one of the plurality of engineering workflow systems is identified by:

broadcasting a request indicative of the GHG footprint evolution report to the plurality of engineering workflow systems;

querying a database comprising a list of abatement technologies associated with each of the plurality of engineering workflow systems, wherein each abatement technology of the list corresponds to a device associated with performing an operation to reduce the amount of GHG emissions; and receiving one or more responses from the plurality of engineering workflow systems, wherein the plurality of engineering workflow systems are configured to provide the one or more responses based on an association between a respective abatement technology of each of the plurality of engineering workflow systems and the GHG footprint evolution report;

sending the sustainability model to the at least one of the plurality of engineering workflow systems;

receiving an action plan to improve the amount of GHG emissions from the at least one of the plurality of engineering workflow systems; and automatically sending one or more commands to the plurality of devices based on the action plan in response to receiving the action plan, wherein the plurality of devices is associated with performing the one or more operational tasks performed with regard to extracting the hydrocarbons from the subsurface region; and in response to receiving the one or more commands:
adjusting, by the plurality of devices associated with the one or more operational tasks, one or more respective operations to control a flow of hydrocarbons from the subsurface region.

18. The non-transitory computer-readable medium of claim 17, comprising:
receiving a carbon disclosure project (CDP) report; and
generating the sustainability model based on the CDP report.

19. The non-transitory computer-readable medium of claim 17, comprising:
receiving real-time data from additional devices configured to measure scope 1 type emissions associated with the one or more enterprise operations; and
generating the sustainability model based on the real-time data.

20. The non-transitory computer-readable medium of claim 17, comprising:
receiving real-time data from one or more sensors configured to measure scope 1 type emissions associated with the one or more enterprise operations; and
generating the sustainability model based on the real-time data.

* * * * *